May 17, 1938.  M. S. CURTIS  2,118,020

MACHINE TOOL

Original Filed Oct. 31, 1927  18 Sheets-Sheet 1

INVENTORS
BY M. S. Curtis
Chas J Williamson
ATTORNEY.

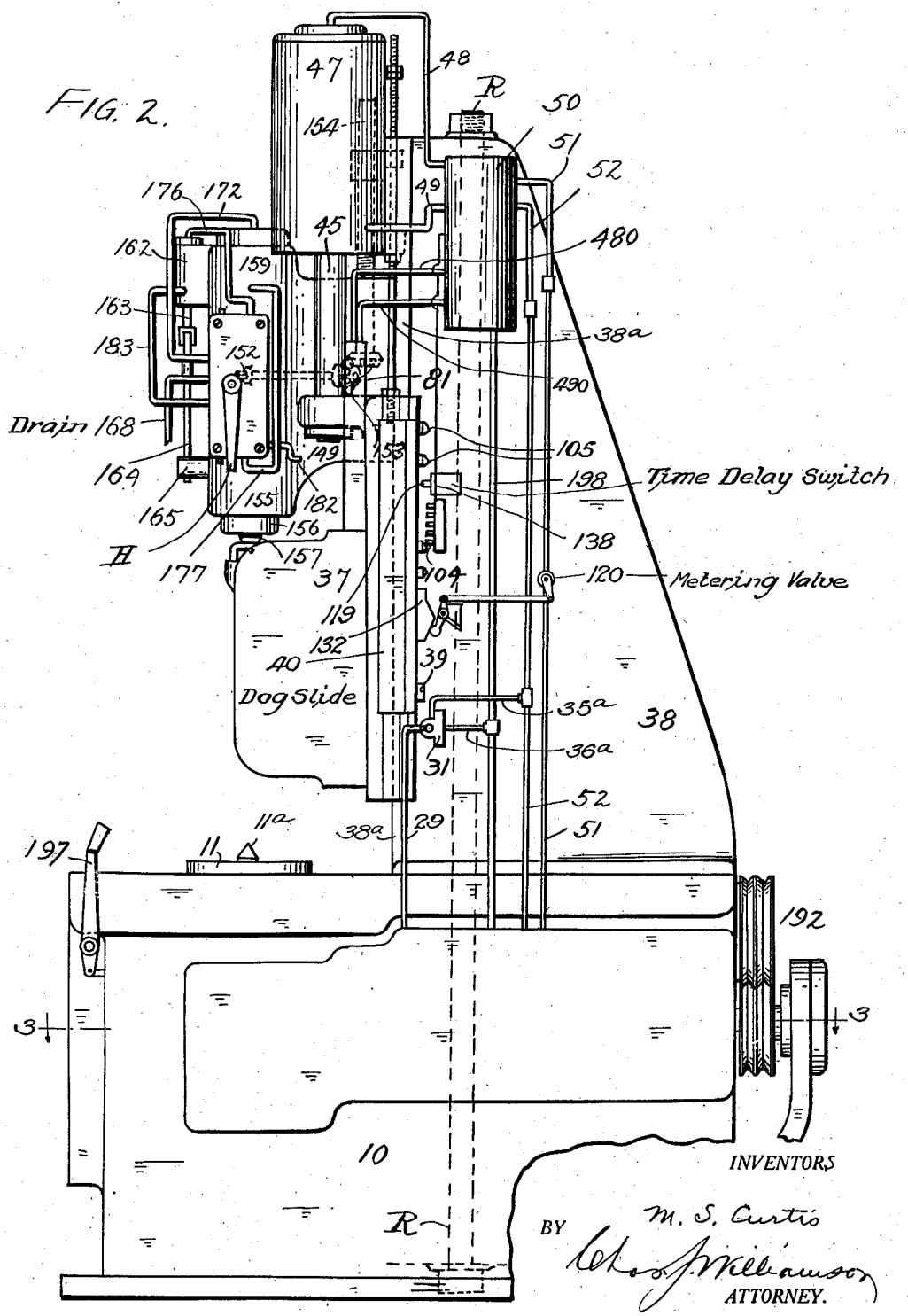

May 17, 1938.  M. S. CURTIS  2,118,020
MACHINE TOOL
Original Filed Oct. 31, 1927    18 Sheets-Sheet 3
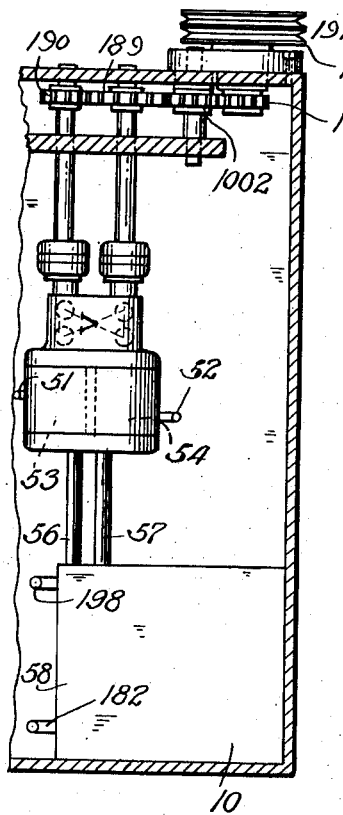
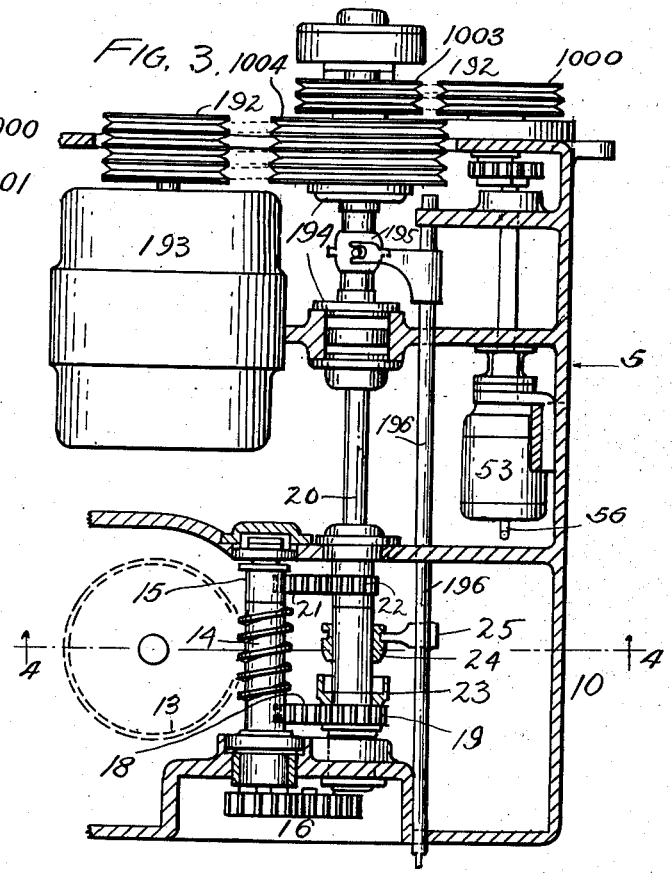
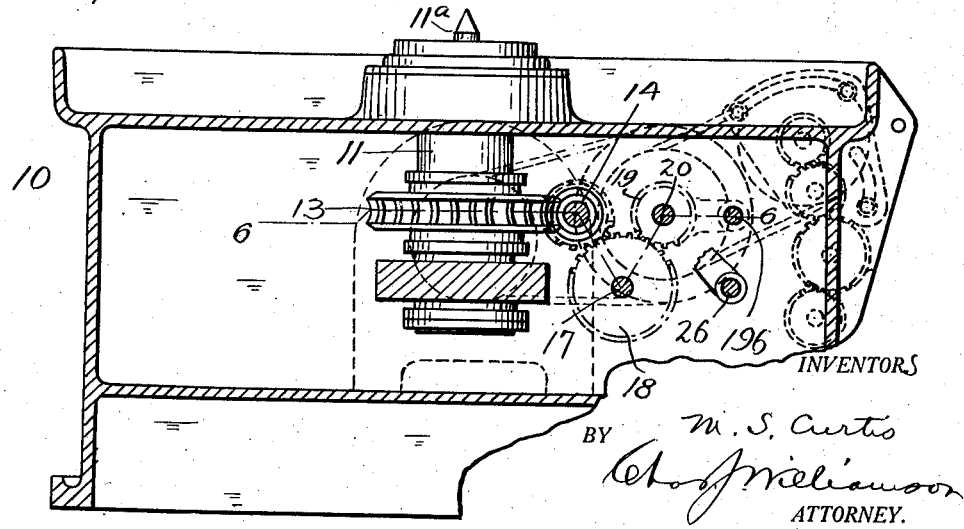

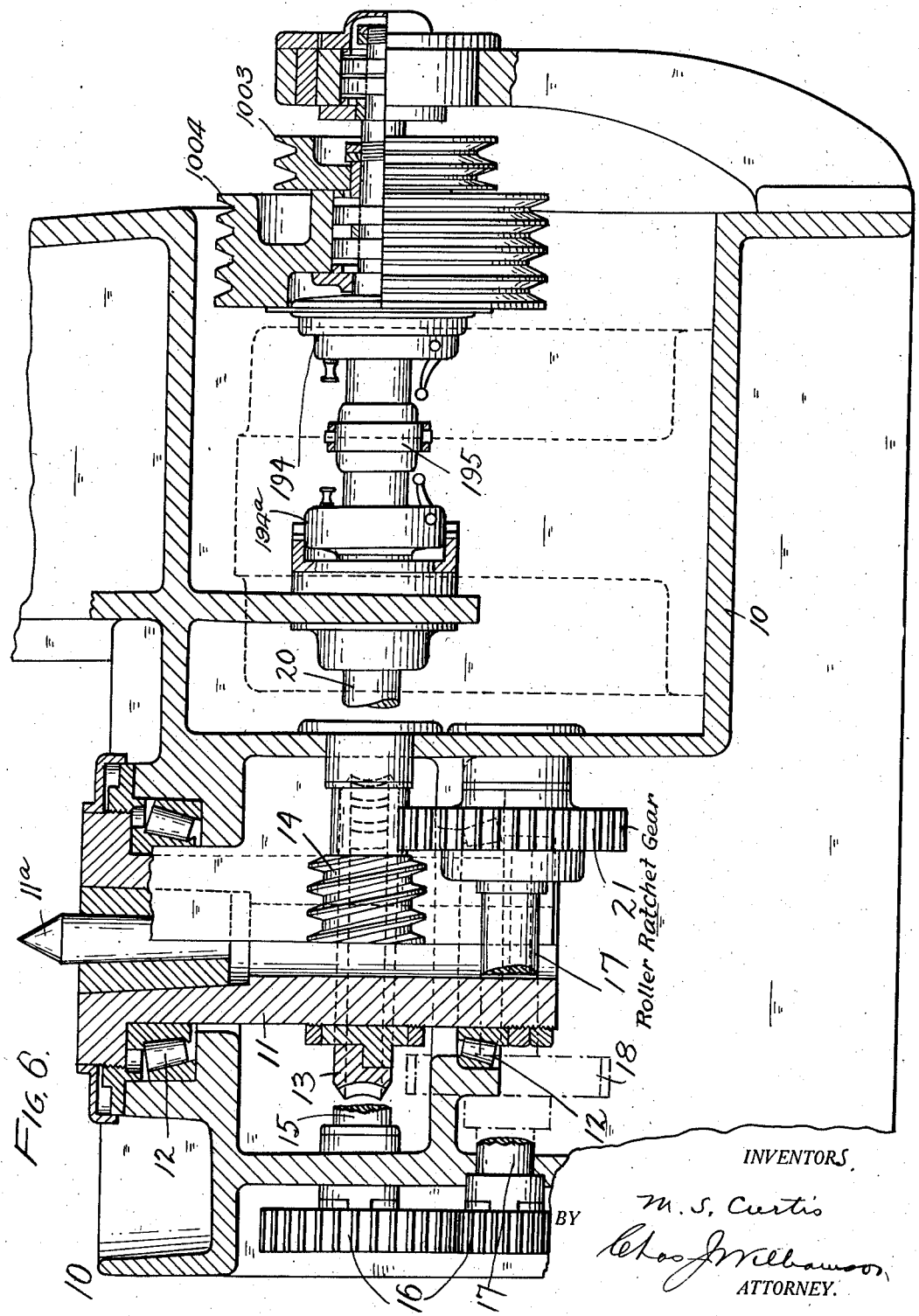

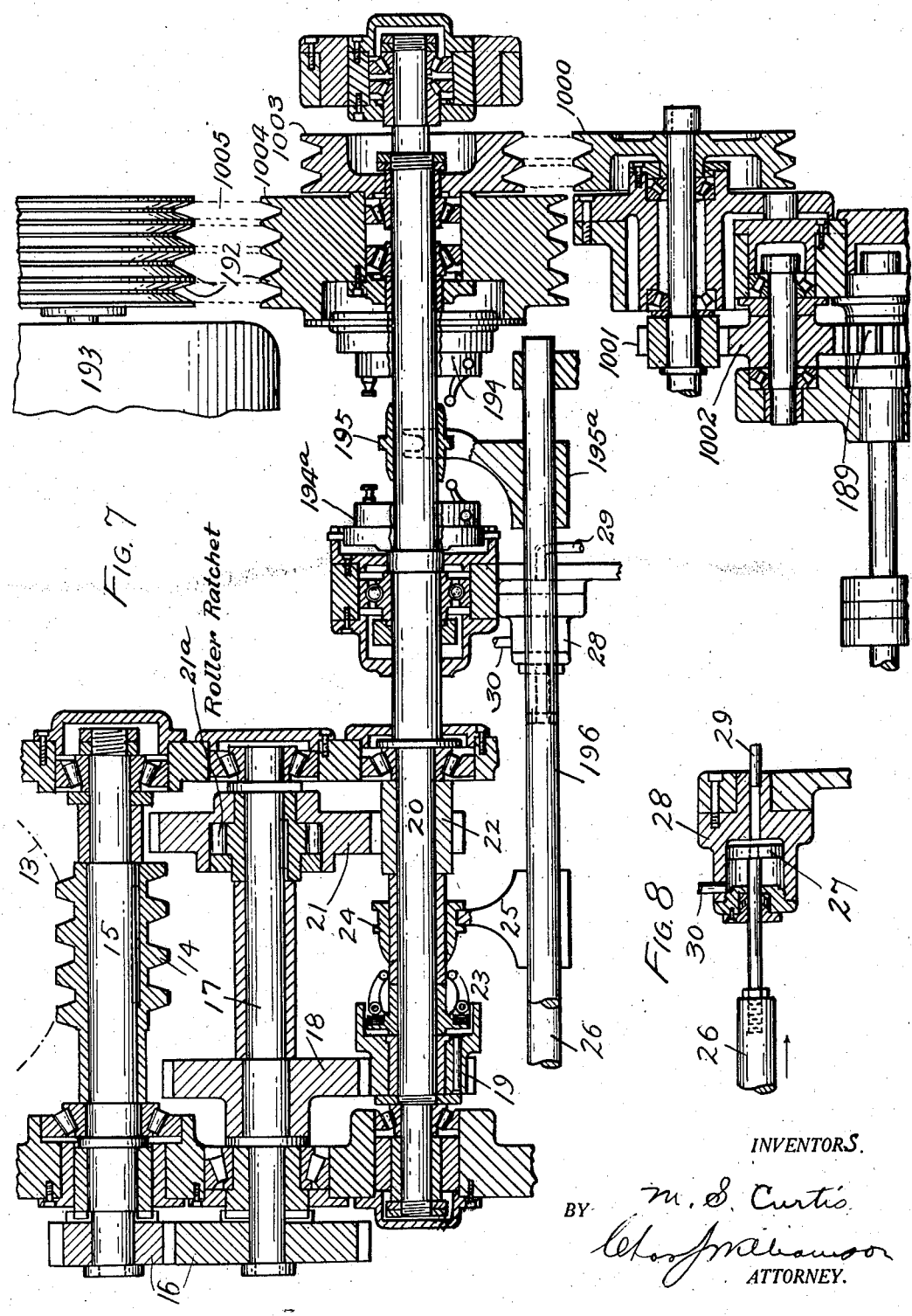

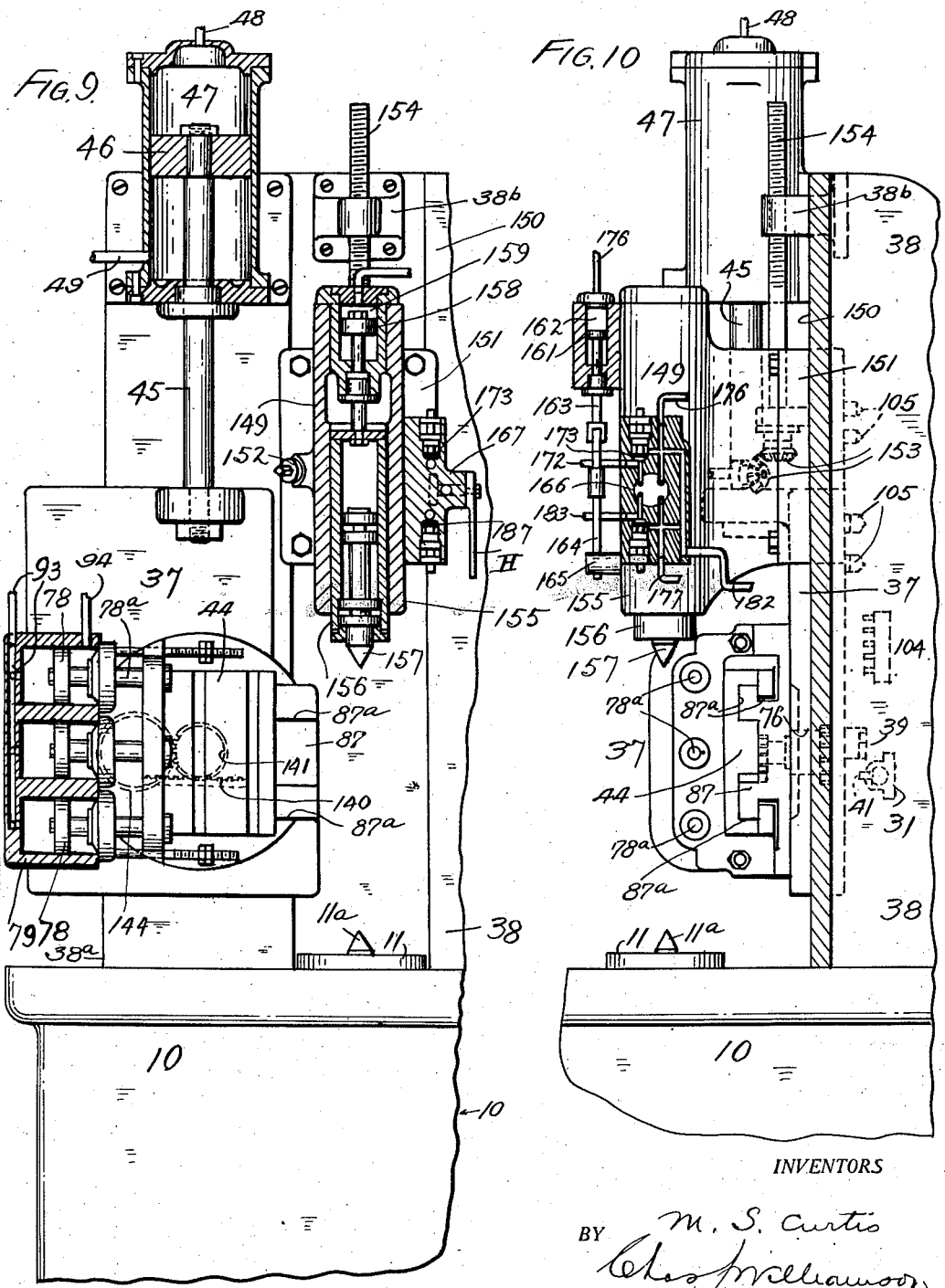

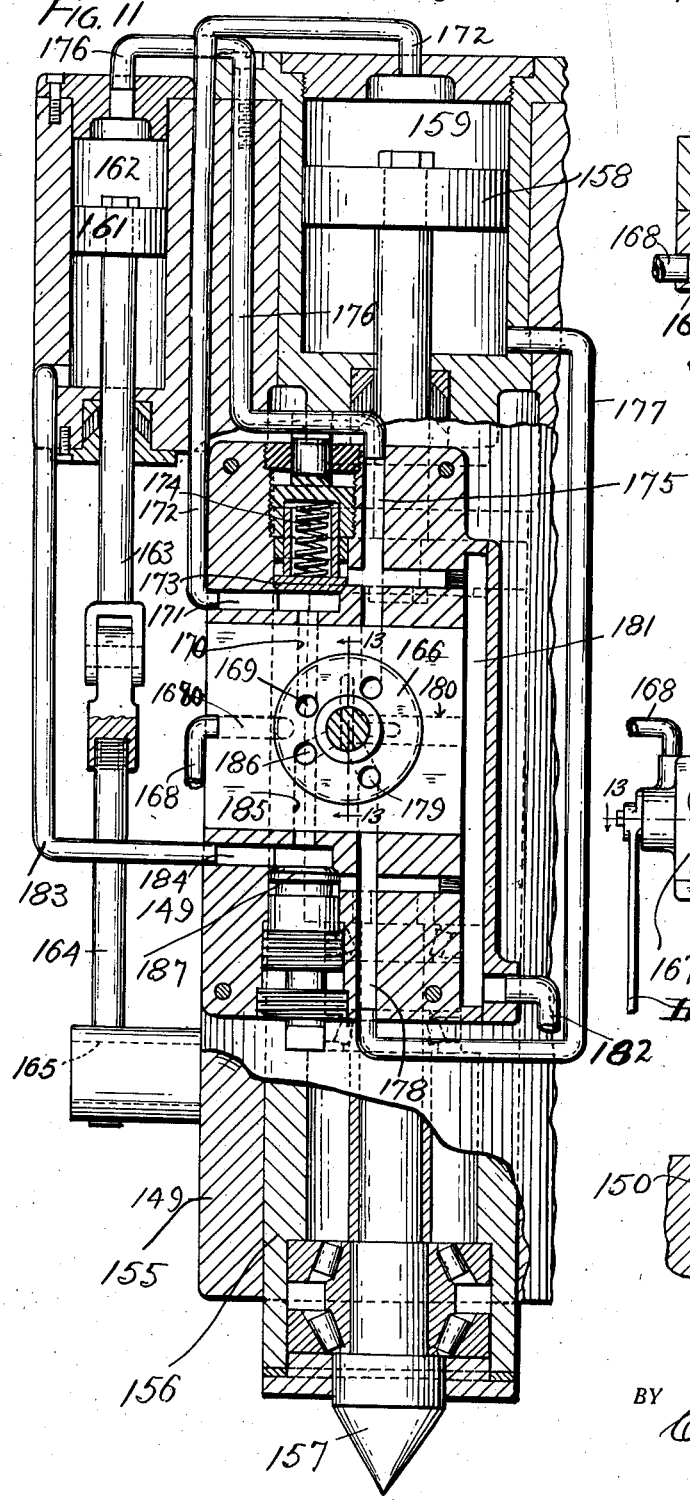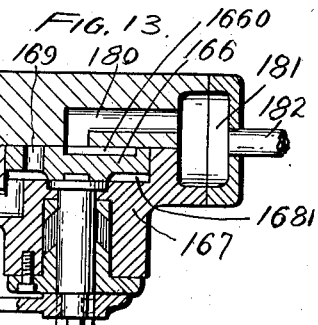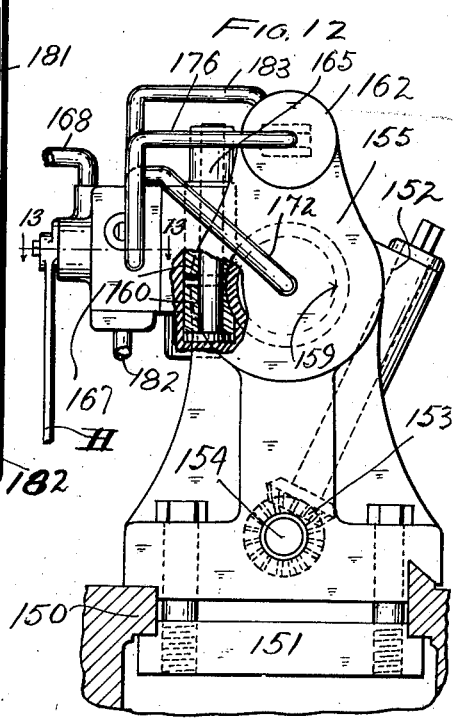

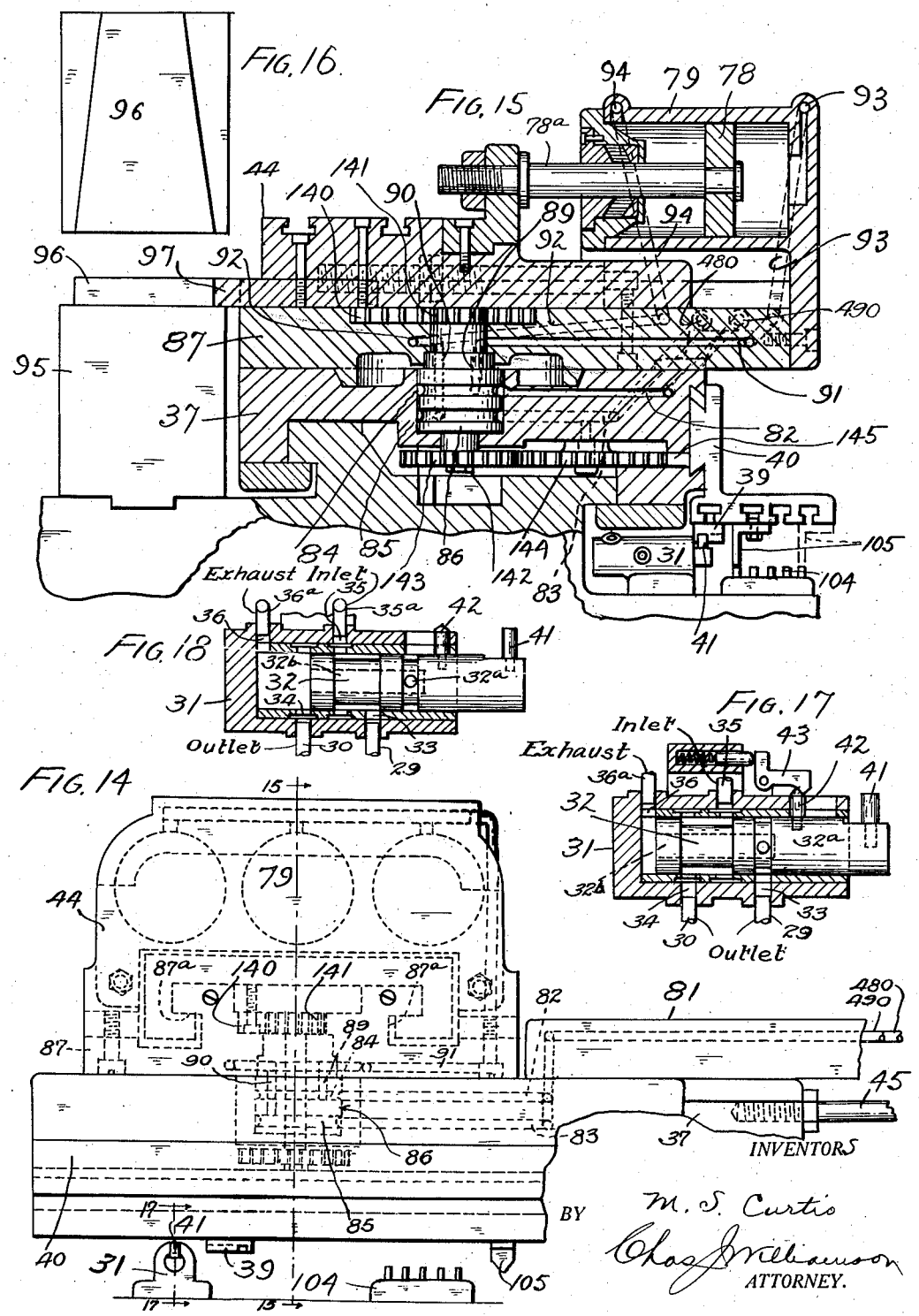

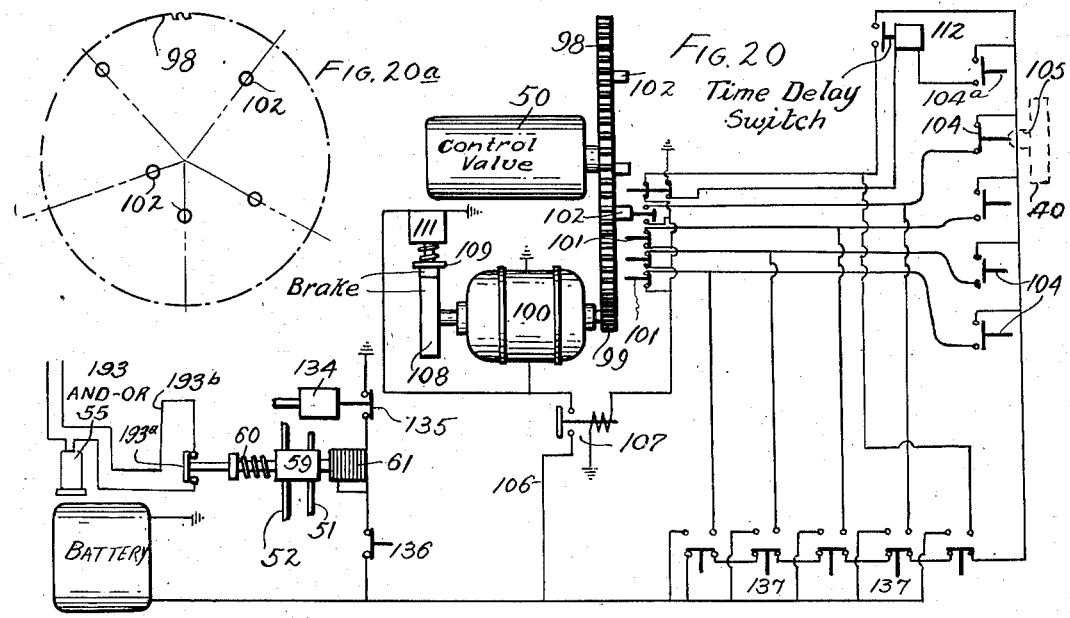
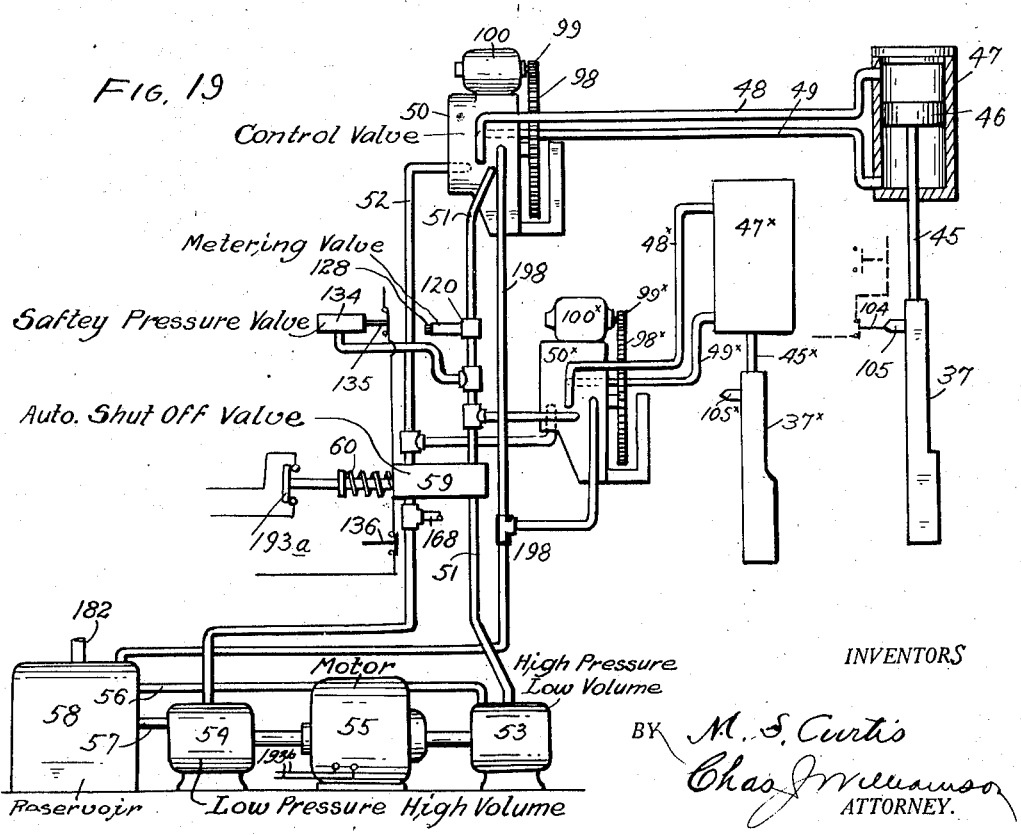

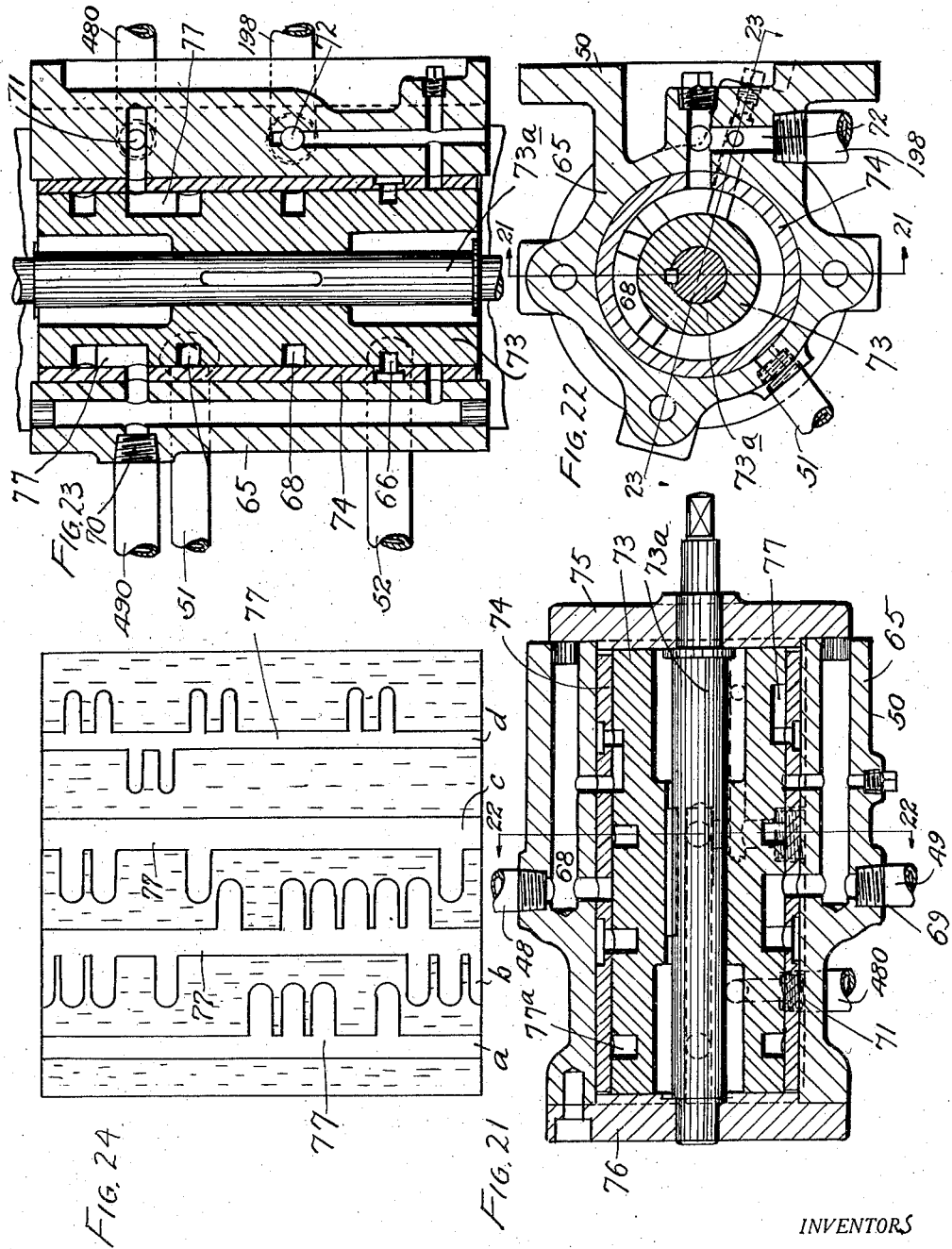

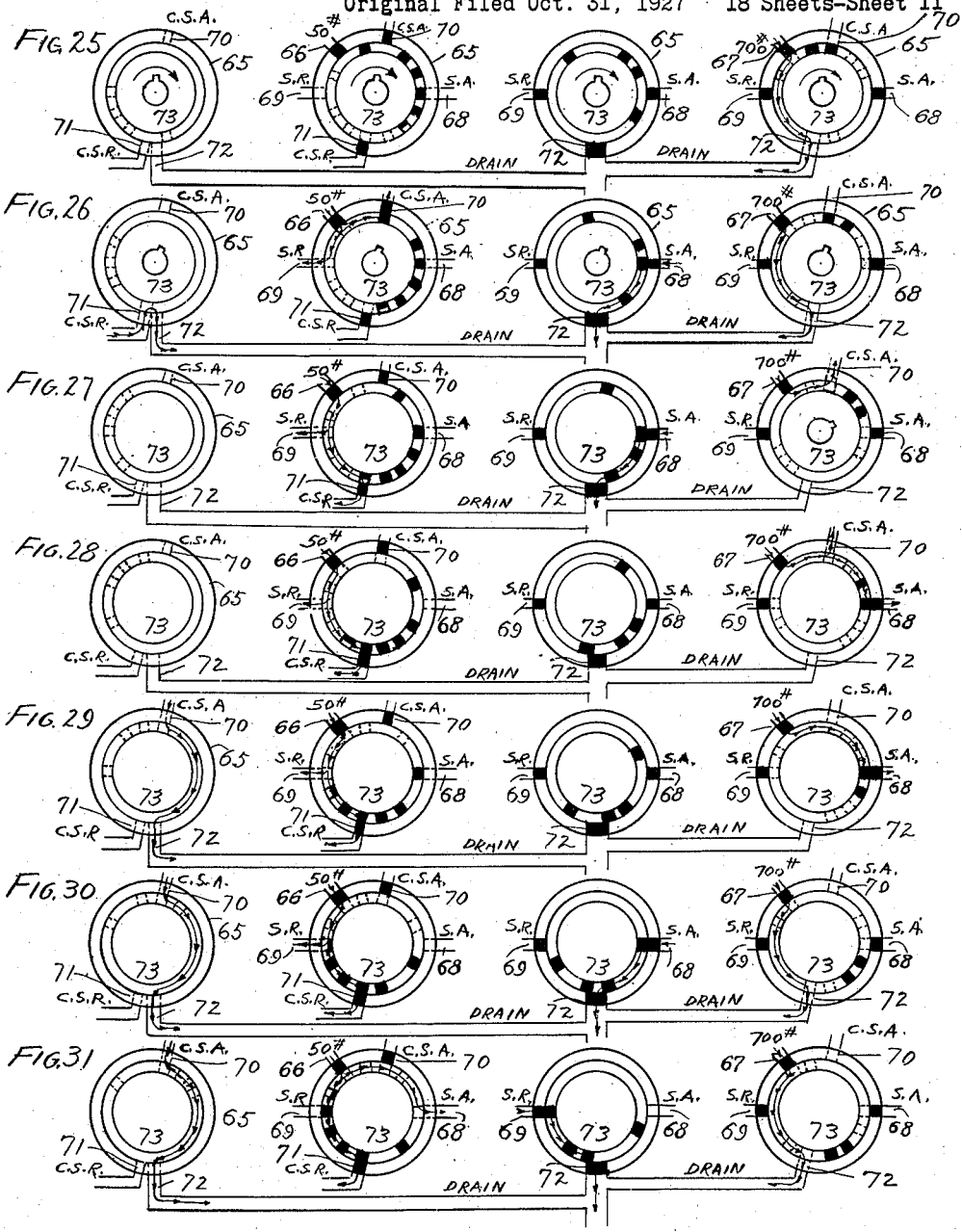

May 17, 1938. M. S. CURTIS 2,118,020
MACHINE TOOL
Original Filed Oct. 31, 1927 18 Sheets-Sheet 12
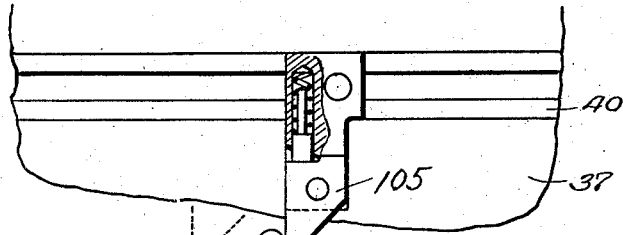
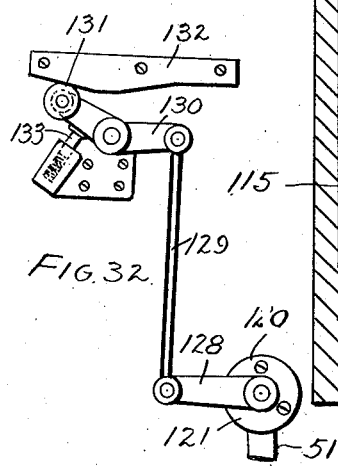
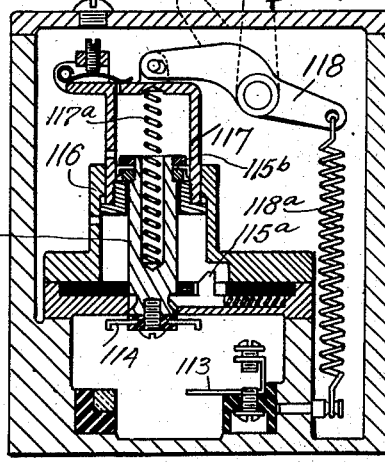
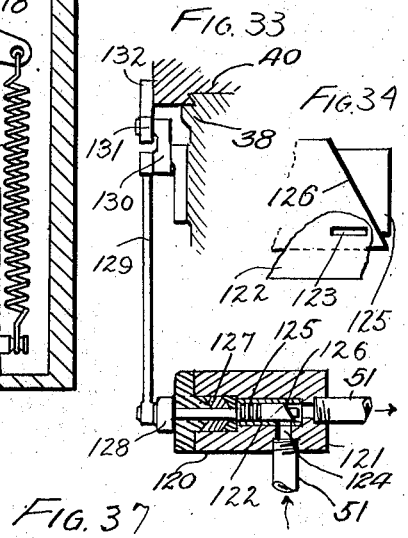
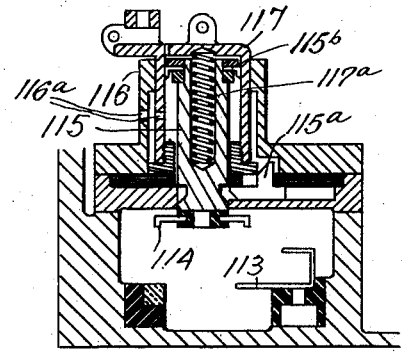
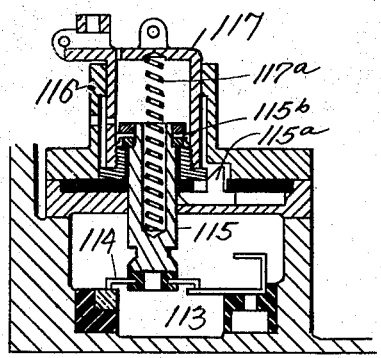
INVENTORS.
BY M. S. Curtis,
Chas. J. Williamson
ATTORNEY.

May 17, 1938.  M. S. CURTIS  2,118,020

MACHINE TOOL

Original Filed Oct. 31, 1927  18 Sheets-Sheet 13

INVENTORS

BY M. S. Curtis,
Chas. J. Williamson
ATTORNEY.

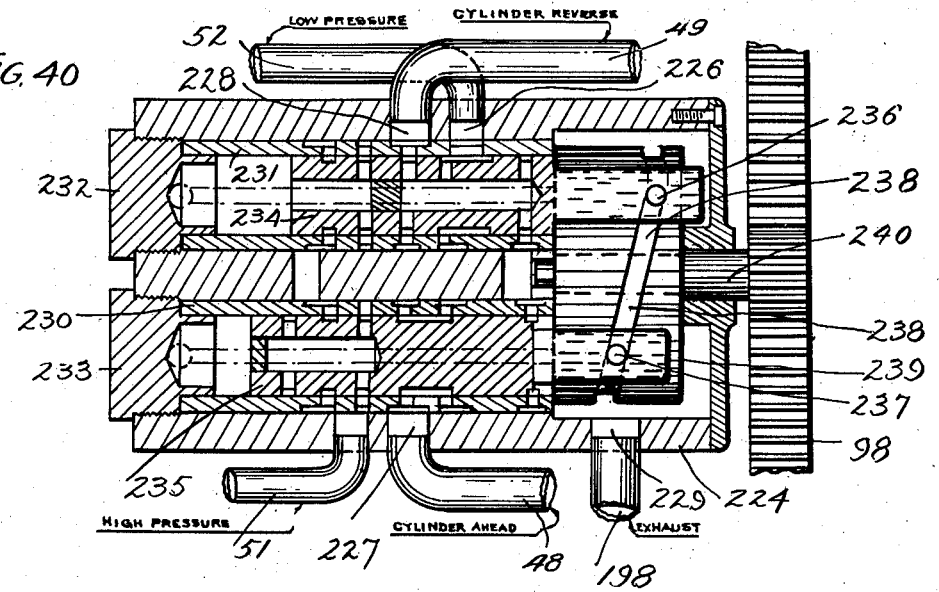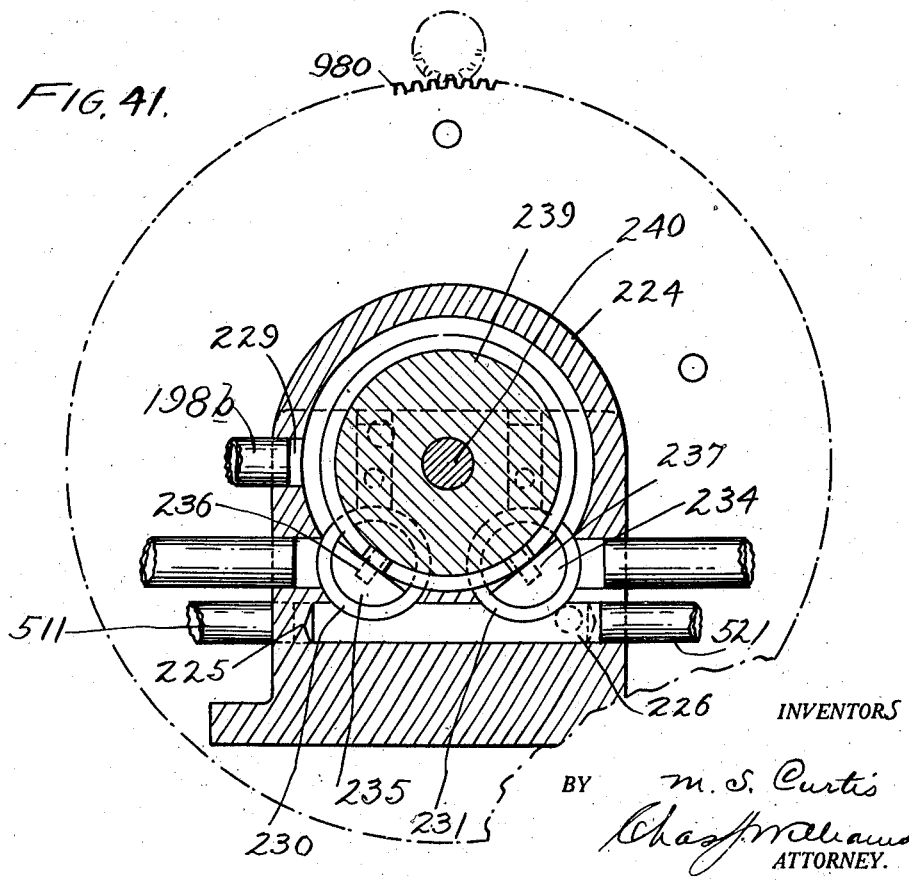

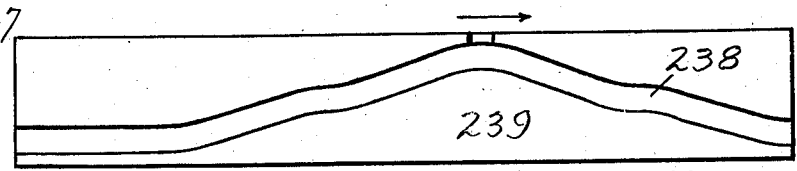
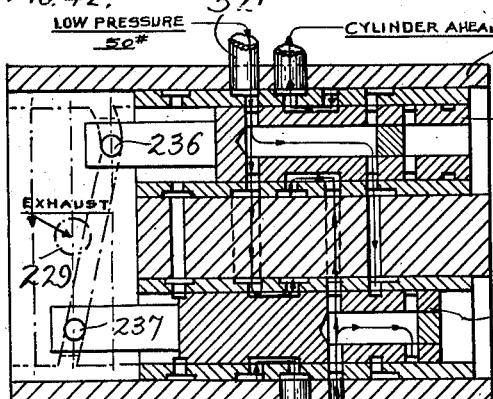
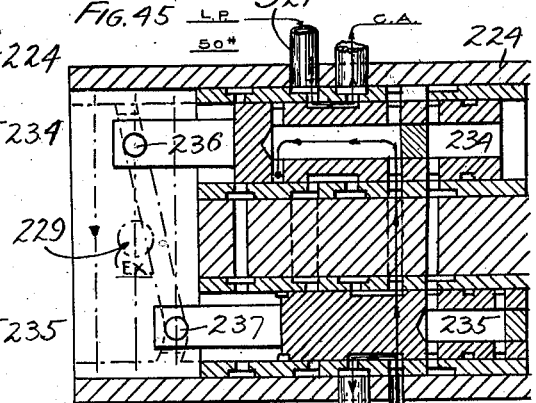
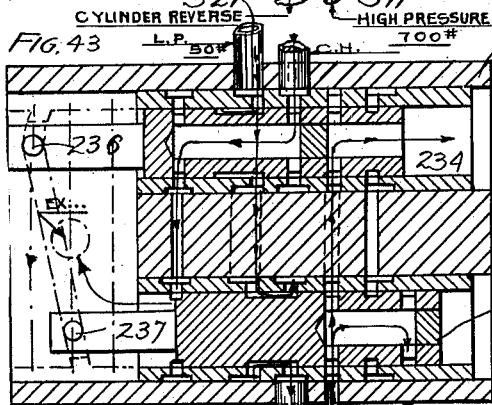
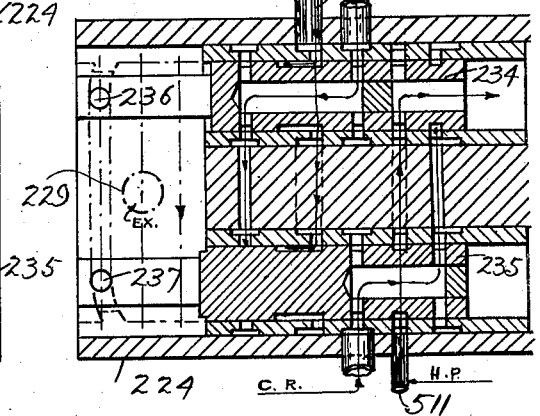
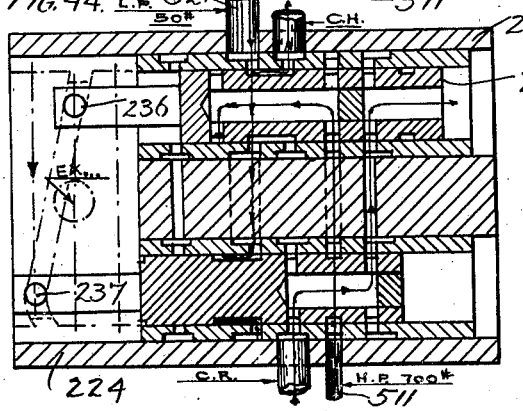

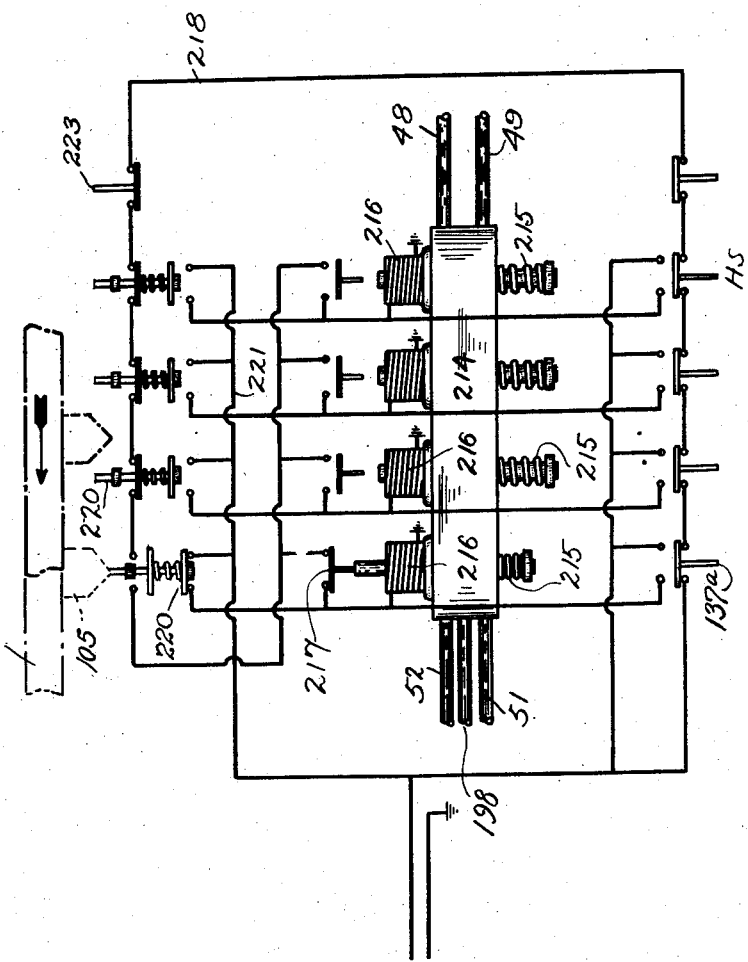

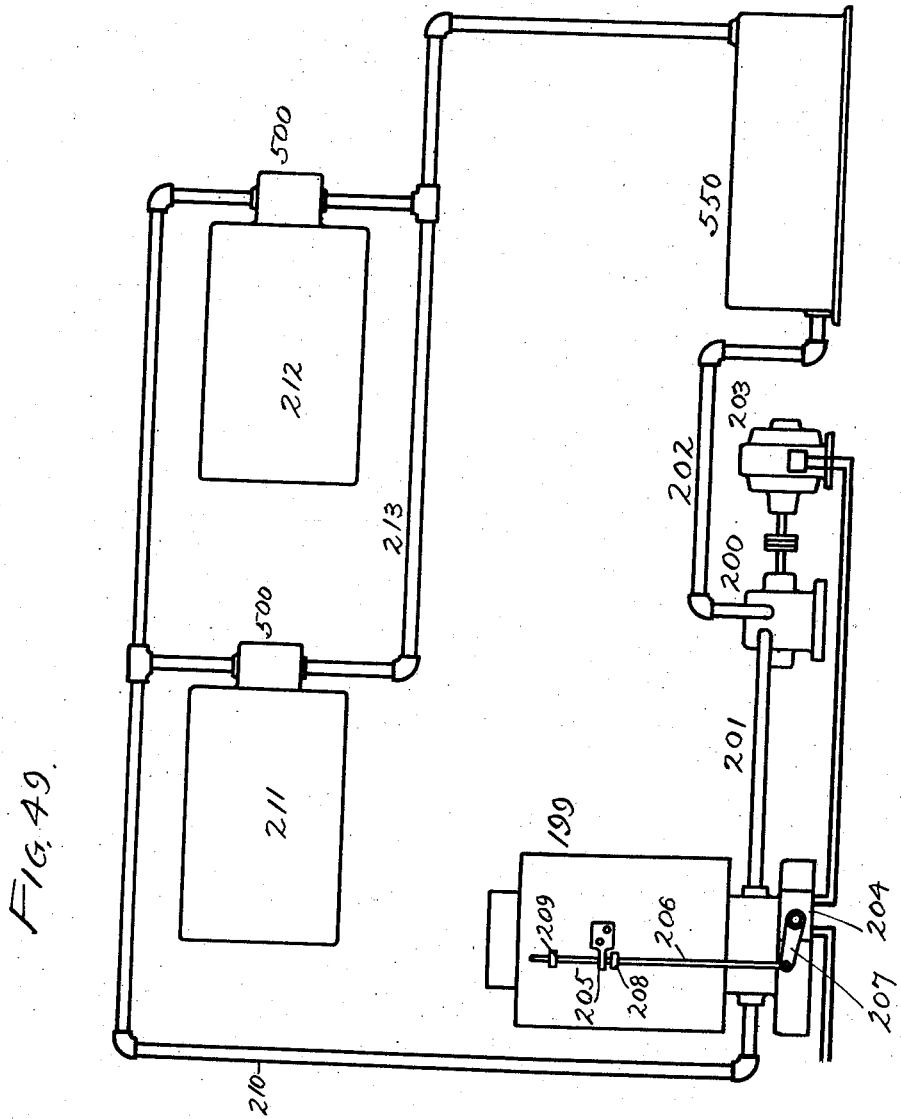

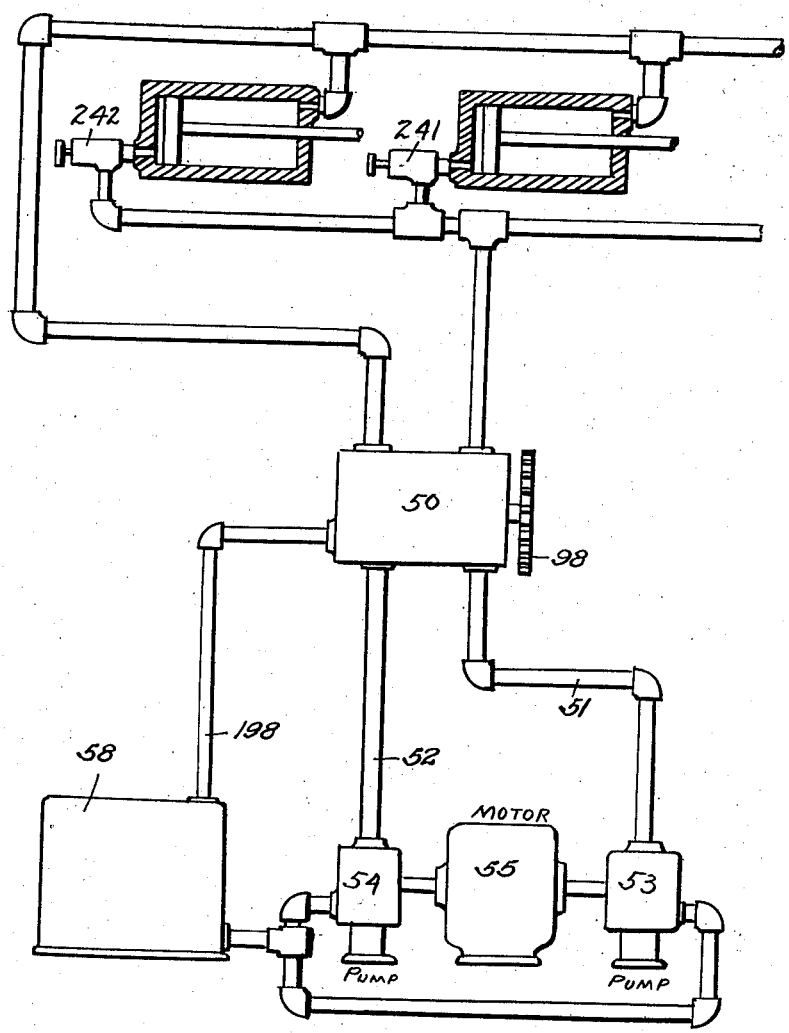

Patented May 17, 1938

2,118,020

UNITED STATES PATENT OFFICE 2,118,020

MACHINE TOOL

Myron Shirley Curtis, Pawtucket, R. I., assignor to William Wallace Potter, Pawtucket, R. I.

Application October 31, 1927, Serial No. 230,119
Renewed June 12, 1937

59 Claims. (Cl. 82—2)

The present invention relates to means of operating machine parts hydraulically by fluid pressure and controlling said operation electrically and is particularly adaptable to machine tools. As a matter of convenient designation the term "hydraulic" will be used in referring to any fluid agency used.

The advantages of hydraulic operation of machine tools are generally well-known, such as simplicity of construction and elimination of breakage. However, so far as they have been developed, hydraulically operated machines have certain disadvantages,—some of which, for example are, (1) providing, as is customary, a pump for each cylinder or servo-motor, which has its own control valve for controlling both the direction and the amount of flow of the fluid, all of which entails great expense and complicated construction and increases liability to derangement; (2) where a single pump is employed to operate a plurality of said servo-motors, it must not only have capacity enough to furnish the necessary volume when all units are operating simultaneously on the idle movement, but also must be capable of delivering fluid at a sufficiently high pressure for feeding movements, thus, when the pump is delivering high pressure fluid in low volume for feeding motions the excess capacity must be dissipated through a relief valve with a huge loss of efficiency; and (3) with mechanical control as is now employed, difficulties arise with the control mechanism which must be actuated by the slide or moving member itself and, where there are more than one such members and where their motion may be in any combination of directions, the matter of control is very difficult and costly.

The object of this invention is to provide a construction free from the objections before mentioned and having the minimum number of parts, certainty or reliability of operation and the possibility of utilization in a variety of machines.

A further object of the invention is the provision of a machine having, among others which will appear as the specification proceeds, the following characteristics: (1) a single pump that takes care of any number of operating units of a machine, (2) a pump mechanism which delivers fluid under certain conditions of operation at high pressure and low volume during, or to effect, the actual work operations of the machine and, which under other conditions, delivers fluid at low pressure and in large volume as during the non-working or idle motions, or also delivers or may deliver fluid at low pressure and large volume simultaneously with the high pressure and low volume, as during the actual work motions; (3) a single pump for a number of machines; (4) a single valve means for controlling the work-movements of more than one unit actuating means or servo-motor; (5) a metering device controlled by a work-moving part or tool slide and which regulates the quantity of fluid and, hence, the rate of movement of the part or member concerned; (6) means for automatically controlling the operation of said valve means from the movement of work-performing parts whereby the sequence of operation of said parts is governed; (7) means for manually controlling each operation of said valve means from one or more remote points; (8) controlling the valve operations or movements by mechanism which will cause delayed action under conditions which require it which are usually, but not necessarily, at the end of the working stroke; (9) hydraulic clutch shifting means actuated by the work-operating parts to change the speed of spindle rotation; and (10) automatically operated safety devices for stopping the operation of the machine upon variation in either the hydraulic or control circuits or upon failure thereof.

In the drawings the invention is illustrated for the purposes of example only in connection with a vertical type, single spindle, center turning tool-machine. Although it may be embodied in similar machines using chucks instead of centers; machines of the platen type, in which the tools are mounted on a flat plate or platen and which have chucks for holding the work; automatic turret lathes, both vertical and horizontal; multiple spindle station-type chucking machines; drill presses, or in fact, any type of machine tool where there is a relative feeding movement between the work and the tools for operating on the work.

The invention consists of whatever is described by or is included within the terms or scope of the appended claims.

In the drawings:

Figure 2 is a side elevation;

Figure 3 is a horizontal section on the line 3—3 of Fig. 2;

Figure 4 is a section on the line 4—4 of Fig. 3;

Figure 5 is a partial side view looking in the direction of the arrow 5 in Figs. 1 or 3 with the side wall removed to show the pump drive.

Figure 6 is a vertical section on the line 6—6 of Fig. 4 with parts in elevation;

Figure 7 is a detail view in section of the spindle and pump drive with parts spread out or separated for clearness of illustration;

Figure 8 is a detail view in section through the cylinder 28 for operating the spindle clutches;

Figure 9 is a front view with parts in section of a portion of the machine shown in Fig. 1;

Figure 10 is a side elevation of Fig. 9 in the direction of the arrow 10, with parts in section;

Figure 11 is a section through the tail-stock substantially on the line 11—11 of Fig. 1.

Figure 12 is a plan view of the tail-stock.

Figure 13 is a section on the line 13—13 of Figs. 11 and 12;

Figure 14 is an end elevation of a cross slide looking in the direction of the arrow in Fig. 1;

Figure 15 is a section on the line 15—15 of Fig. 14;

Figure 16 is a plan view of the cross slide former cam;

Figure 17 is a section through the clutch control valve substantially on the line 17—17 of Fig. 14;

Figure 18 is a section similar to Fig. 17 showing a different position of the valve;

Figure 19 is an elevation somewhat diagrammatic illustrating the general arrangement of the elements of the hydraulic organization;

Figure 20 is a similar view to illustrate the electrical devices and their circuits;

Figure 20a is a detail view showing the arrangement of the switch operating detents of the control valve;

Figure 21 is a longitudinal section through the compound control valve substantially on the line 21—21 of Fig. 22;

Figure 22 is a cross section through the control valve substantially on the line 22—22 of Fig. 21.

Figure 23 is a section of the control valve on the line 23—23 of Fig. 22;

Figure 24 is a layout of the ports of the rotary control valve;

Figure 38:
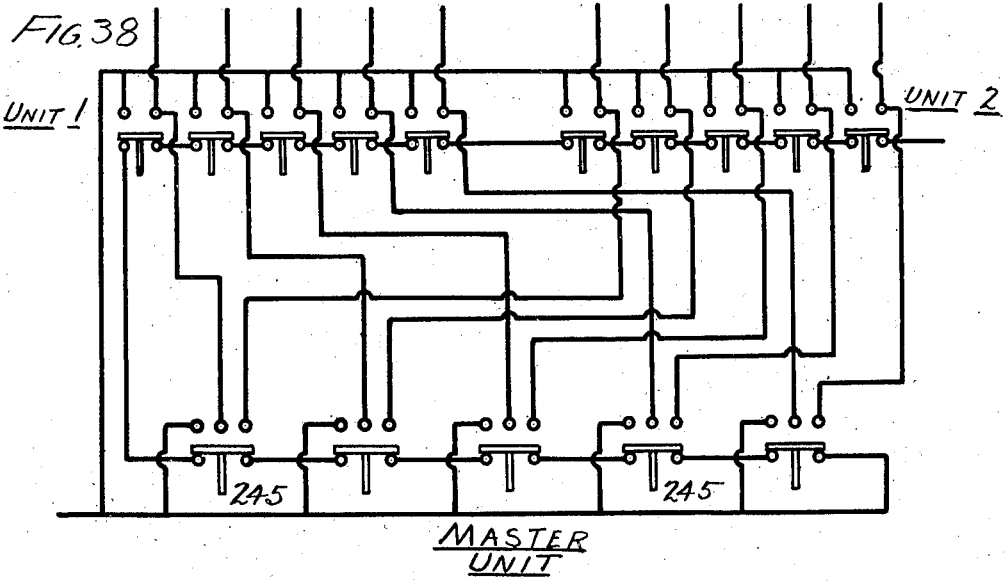
Figure 39:
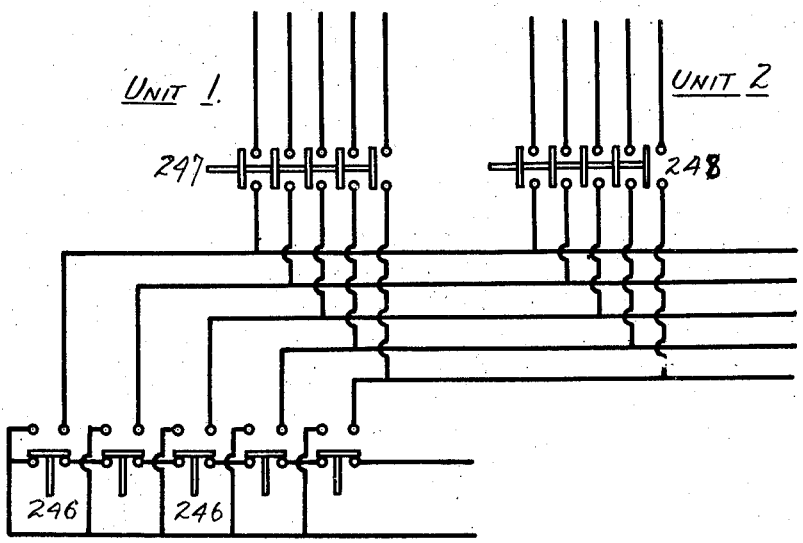

Figures 25 to 31, inclusive, are views somewhat diagrammatic illustrating the various positions of the rotary control valve and the direction of flow of fluid therethrough;

Figures 32, 33 and 34 are detail views of the metering valve;

Figures 35, 36 and 37 are detail views of a device for delaying circuit closing of the switches;

Figures 38 and 39 are diagrammatic views of switch arrangements that may be employed for control of the operation of the control valve;

Figures 40 to 47, inclusive, are detail views of a form of control valve that may be employed;

Figure 48 is a diagrammatic view showing yet another construction of the control valve and electrical control devices therefor that may be used;

Figure 49 is a view diagrammatic in nature illustrating the employment of an accumulator in the hydraulic arrangement;

Figure 50 is an elevation, somewhat diagrammatic with parts in section illustrating a construction of machine in which the several cylinders have their own metering valve.

The single spindle center turning machine, selected to illustrate, by way of example, an embodiment of the invention, is illustrated in its general construction and details in Figures 1 to 18. Described generally, said machine comprises a base housing 10 containing the live spindle 11, its driving mechanism (Figs. 3, 6 and 7), the hydraulic pump 53—54, a column 38 extending above the base 10 and supporting the tail-stock 149, a plurality of tool holding slides 44 and hydraulic devices 79 connected with the pump 53—54 through pipes 480 and 490 for actuating said slides.

There are two slidable carriers 37, one for each tool-slide and each mounted upon vertical guide-way 38a on the column 38 and on opposite sides of and parallel with the live-center 11a. For convenient designation, the carriers 37 will hereafter be termed "carriages". The tool slides 44 are each swiveled to its carriage 37 so that it may be adjusted to feed at any desired angle relative to the work on the centers 11a and 157 and, since their sliding movement in the type of machine illustrated is generally crosswise, they will be termed "cross slides" for convenient identification. Associated with and constituting a part of the control means of the hydraulic apparatus are electrical devices, including switches that are automatically actuated at appointed times by the hydraulically moved member and also manual switches.

It is preferred to make the machine base 10 and column 38 separate castings or units because thereby they can be interchanged with corresponding units to alter the type of machine and thus secure an important manufacturing advantage. Thus, all the parts placed in the base may serve equally well with the parts of a variety of machines which are mounted on the column. For example, a vertical turret lathe and a platen type machine are similar as to the spindles and chuck and gearing mounted on the base 10 associated therewith, and—hence—a column equipped with a turret and cross slides could be substituted for a like column equipped with the tail-stock 149 and carriages 37 or with a platen, and a chuck may be substituted for the "live-center" 11a. The base and column, when made separate, will be tied by vertical tension bolts or rods R, as indicated in Fig. 2.

*Spindle and spindle drive*

The machine base housing 10 has mounted in it a vertical spindle 11 (see Figs. 1, 2, 4 and 6) with a work center 11a and is journaled by roller bearings 12 near top and bottom. A worm gear 13 is fixed to the spindle to rotate the same and is driven by a worm 14 keyed to a horizontal shaft 15 (see Fig. 7) which, by several trains of gearing, may be driven at various speeds so that the speed of the spindle may be varied. These trains include hand change gears 16 on shaft 15 and a parallel shaft 17 and two automatically controlled trains, which latter include (1) a gear 18 on shaft 17 meshing with a pinion 19 loose on a drive shaft 20, and (2) a gear 21 having a roller ratchet clutch connection 21a (Fig. 7) with the shaft 17 and which meshes with a pinion 22 fixed to drive shaft 20. The two gears 18 and 21 on the shaft 17 and their meshing pinions are of different sizes so that the speed of the shaft 17 may be either of two speeds. The loose pinion 19 is adapted to be automatically clutched to and unclutched from the drive shaft 20 and, when it is clutched thereto, the shaft 17 is driven therefrom and runs away from roller ratchet gear 21. When pinion 19 is unclutched from shaft 20, the shaft 17 is driven by pinion 22 and ratchet gear 21. The clutch for pinion 19 is a friction clutch 23 of usual construction, operated by a cone thimble 24, slidable on the drive shaft 20. Cone thimble 24 is engaged by a yoke 25 fixed to a rod 26, one end of which rod is connected to a piston 27 (see Fig. 8) in a hydraulic cylinder 28 and, by the action of fluid pressure successively on opposite sides of piston 27, the rod 26 and thereby the cone thimble 24 is reciprocated to engage and disengage the clutch.

Pipes 29 and 30 lead respectively to opposite sides of piston 27 from a valve 31 (see Figs. 15, 17 and 18), which valve preferably is of the piston type and comprises a body 31, a piston 32 and inlet port 35, an exhaust port 36, two outlet ports 33 and 34 with which, respectively, the pipes 29 and 30 are connected. Thus, when the valve 32 is in the position shown in Figure 17 fluid, under pressure from pump 53 flows through pipe 35a into the valve 31 through inlet port 35 and out through port 34 through pipe 30 to cylinder 28, thus moving the clutch operating rod 26 in the direction of the arrow in Figure 8, and disengaging clutch 23 and, at the same time, the opposite side of the piston 27 is exhausted through pipe 29, valve groove 32a and passage 32b to exhaust port 36 back to reservoir 58 through return pipe 198. In the other position of the piston 32, shown in Figure 18, fluid pressure is admitted through inlet port 35 to outlet port 33, pipe 29, piston 27 for moving the latter to engage the clutch 23 and, at the same time exhaust the opposite side of the piston 27 through pipe 30, port 34 of valve 31 to exhaust pipe 36a, return pipe 198 to reservoir 58.

The piston valve 32 is actuated by the movement of carriage 37 or its cross slide 44 by means of a dog 39 adjustably mounted on a slide 40. Slide 40 is slidable on carriage 37 and may have movement imparted to it by the movement of carriage 37 (as when carried with it) or by the movement of slide 44 in the manner hereinafter described.

The dog 39, by contact with a stud or pin 41 on a plunger prolongation of the piston valve 32, shifts the latter. To secure quick movement of the piston valve in the desired direction and to lock it into position after being shifted, the bevelled end of a pin 42 on said valve is engaged by the oppositely bevelled nose of a spring pressed lever 43.

Drive shaft 20 is driven by motor 193 through pulley 192 (see Figs. 3, 7 and 8) which, by belt 1005, drives pulley 1004 which runs loosely on shaft 20. Pulley 1004 may be clutched to shaft 20 by friction clutch 194 or shaft 20 may be braked by friction brake 194a. Clutch 194 and brake 194a are operated by the reciprocation of cone thimble 195 which is connected by a yoke 195a with a rod 196 extending through to the front of the machine where it carries a hand lever 197 (see Figs. 1 and 2). Therefore, by means of hand lever 197, shaft 20 may be either connected with motor 193 or held stationary.

*Tail-stock*

The tail-stock 149 is slidable in the vertical guide-way 150 disposed between the carriages 37 of the column 38, and is adjustable by means of a crank handle (not shown) on shaft 152 which, through mitre gears 153, rotates screw 154 threaded in bracket 38b on the column. The tail-stock may be and preferably is fastened in adjusted position to the column 38 by a clamp plate 151. The tail-stock 149 comprises a tubular body 155 in which is longitudinally slidable a sleeve 156 having the live center 157 journaled in an end thereof on roller bearings. The sleeve 156 is given longitudinal movement in the body 155 by piston 158 in cylinder 159 also disposed in the tubular body 155 at the end thereof opposite the sleeve 156. The sleeve 156 is clamped in its desired position by a rotatable binder 160 (Figs. 1, 10, 11, 12) operated by piston 161, in cylinder 162, through the piston rod 163, connecting rod 164 and lever 165. Pistons 158 and 161 are operated hydraulically through valve 166 mounted to be oscillated by a handle H in a valve body 167 mounted on the tubular body 155 and into which liquid enters from the main hydraulic system by pipe 168 preferably, but not necessarily, from the pump 53.

With the parts in the position shown in Fig. 11 a piece of work has just been placed in the machine on the center 11a, the tail-stock center 157 is ready to be brought down to the work and bind it in position. In the position of the valve 166, shown in Figures 11 and 13, the liquid enters through pipe 168, port 1680, to chamber 1660, at the back of the valve 166. It then passes through port 169 in the valve into port 170 and chamber 171. It then flows through pipe 172 to the cylinder 159, pushing the piston and rod downward until the center 157 touches the work. Immediately the center 157 touches the work, pressure on the piston will begin to build up and the pressure in chamber 171 will increase until valve 173, which is normally held seated by calibrated spring 174, is lifted. This allows liquid to flow from chamber 171 through port 175 and pipe 176 to cylinder 162, moving piston 161 downward and binding the sleeve 156. Meantime the drain from the other side of piston 158 is flowing through pipe 177, passage 178, port 179 of the exhaust port 180, drain chamber 181 and then out through drain pipe 182 connected to the reservoir 58 (Fig. 19). The exhaust from the other side of the piston 161 drains through pipe 183, passage 184, passage 185, port 196 to drain pipe 182 and thence to reservoir 58. When the work is finished the valve handle H is thrown into its other position thus permitting the fluid pressure to flow from pipe 168 through port 1680, chamber 1660, port 186, passage 185, chamber 184, pipe 183, to cylinder 162, moving piston 161 in the opposite direction or upward to rotate the binder 160 so as to loosen the sleeve 156. When piston 161 has reached the end of its stroke the pressure in the cylinder 162 and, therefore, in the chamber 184 will begin to build up until valve 187 (similar to valve 173) is moved against the pressure of its spring. The liquid then will flow from chamber 184 through valve 187, passage 178, pipe 177 to the cylinder 159 where it will move the piston upward, thus retracting the center 157 from the work. While this operation is going on, cylinder 159 drains through pipe 172, passage 171, passage 170 to drain 180, and cylinder 162 drains through pipe 176, passage 175 to the drain passages 180, 181 and 182.

*Carriage and cross slide*

The construction and operating mechanism of both carriages 37 and of both cross slides 44 are the same and it will be convenient, therefore, to describe one of each.

To the top of the carriage 37 is secured the lower end of a piston rod 45 of a piston 46 (see Figs. 1, 2, 9 and 10) in a cylinder 47 above the carriage so that, by the supply of fluid pressure alternatively to opposite sides of the piston, the carriage will be reciprocated and sliding movements will be at the rates required for working and idle motions of the tools. Fluid pressure is applied to opposite sides of the piston 46 by pipes 48 and 49 which, respectively, lead to opposite ends of the cylinder 47 from the control valve 50 (see Fig. 2) hereinafter described and which control valve receives fluid under pressure from the duplex pump 53—54, hereinafter to be described, by pipes 51 and 52 (Figs. 3, 5 and 9).

Cross-slide 44 is slidably mounted in guideways 87a on cross-slide base 87. Cross slide base 87 has centrally fixed in it a stud 86 extending into a recess in carriage 37 and having a close rotating fit therein so that cross-slide base 87 may be swiveled with relation to carriage 37 on said stud 86. Cross-slide base 87 also carries cylinders 79 in which reciprocate pistons 78 and which pistons, by means of piston rods 78a, reciprocate slide 44 on guideways 87a on the plate 87.

Fluid is supplied to cylinder 79 from control valve 50 through pipes 480 and 490 which enter and telescope in bracket 81, fastened to carriage 37 (see Figs. 1, 2 and 14) so that, when the carriage 37 travels up and down, bracket 81, moving with the carriage, will slide on the pipes 480 and 490. The ports in bracket 81 communicate, respectively, with the ports of passages 82 and 83 (Figs. 14 and 15). The passages 82 and 83 extend through the carriage, as shown in Fig. 14, from the bracket 81 to the swivel stud 86, the passage 82 communicating with the upper annular groove 84 in said stud while the passage 83 communicates with a similar lower annular groove 85 in said stud (Fig. 15).

Passages 89 and 90 in the interior of stud 86 communicate at one end with grooves 84 and 85, respectively, and at the other end with passages 91 and 92, respectively, in the cross-slide base 87. Passages 93 and 94 in the walls of cylinder 79 communicate at one end, respectively, with the passages 91 and 92 and at their other ends with the cylinder 79 and on opposite sides of piston 78, respectively. By this means the cross-slide base may be swiveled on carriage 37 without the necessity of using flexible tubing to make the fluid connections between the pipes 480 and 490 and the cylinder 79.

Securely fastened to the bed of the machine is a former bracket 95 to which may be fastened a former 96. Fastened to the cross-slide 44 is a former-guide 97 which can be fed up to and held against the former 96 by the fluid pressure in cylinder 79 and, as carriage 37 travels along its ways 38a, the cross-slide will follow the shape of the former 96, the action of the fluid pressure being such as to resiliently hold the guide 97 of the cross-slide against the former 96.

As hereinbefore mentioned, a dog slide 40 is mounted on carriage 37 (there being one on each carriage 37) and is provided with a rack 145 meshing through intermediate gear 144 with a gear 143 keyed to shaft 142, rotatively journaled in stud 86, and which has fastened to the other end of it a pinion 141 meshing with a rack 140 fastened to the cross-slide 44. Therefore, any relative movement of cross-slide 44, with respect to cross-slide base 87, will be translated through this train of gearing to slide 40. Thus, as previously described, the dog-slide 40 being carried on carriage 37, any movement of the carriage 37 or cross-slide 44, or a combination of movements of both, will cause a relative motion of slide 40 with respect to valve 31 and switches 104 and, therefore, dogs 39 and 105, which may be adjustably fastened to slide 40, will operate valve 31 or switches 104 in timed relation to the movement of carriage 37 and/or cross-slide 44.

*Hydraulic operating means for work performing parts*

The hydraulic operating means for the work-performing parts which in the present illustration are the carriages 37 and cross-slides 44, is shown more or less diagrammatically in Figure 19 wherein the work-performing parts of two units, either on the same machine or on different machines, is illustrated as actuated by a single pump mechanism 53—54—55, the similar parts of the second machine bearing the same reference numerals as the first except raised by the exponent x.

In Figure 19, a duplex pump 53 and 54 is shown with the two members separate and directly connected to a common motor 55. In practice it is preferred, as shown in Figures 3 to 5, to have the duplex pump with the two members 53—54 joined in a single unit with their respective rotor shafts geared together with gears 189 and 190 and driven from the motor 193, but a separate motor 55 may be utilized if desired. As shown in Figures 1 to 5, gear 189 is connected with groove pulley 1000 by gears 1001 and 1002,—and pulley 1000 is belted to pulley 1003 fastened to pulley 1004, whereby the duplex pump is driven from main motor 193.

The duplex pump is, preferably, of the rotary intermeshing gear type and includes a chamber or member 53 for producing high pressure at low volume, and a chamber 54 for producing low pressure at high volume. By way of example, the high pressure may be 700 pounds per square inch and the low pressure 50 pounds per square inch. The pump chambers are provided, as usual, with relief valve at the point $v$ set to open at selected pressures to by-pass back to their inlet any excess over what is actually being used in the operation of the parts of the machine concerned, this being ordinary construction is not shown. The pumps draw fluid from reservoir 58 through suction pipes 56 and 57.

Instead of using a duplex pump to furnish high and low pressure fluid to the system, I may use an accumulator 199 (see Fig. 49) which is fed by a pump 200 from reservoir 550 through pipes 201 and 202. Pump 200 is driven by motor 203 controlled by switch 204 whose action depends upon the capacity of the accumulator. The latter has a finger 205 that moves a rod 206 connected at one end to the switch lever 207, the rod having spaced collars 208 and 209 which the finger engages. This accumulator is of the well-known type and keeps itself full at all times by the means just described. From the accumulator, delivery pipe 210 leads to the control valves 500 (similar to valve 50) of machines generally indicated at 211 and 212 and the drain from these units flows through drain pipe 213 back into the reservoir 550. By this arrangement, only the amount of fluid actually used is pumped and any pulsations due to the pump are done away with and any number of units can be operated from one accumulator. There is shown but one accumulator, but it is understood that two accumulators could be furnished, one to give high pressure for feeding and the other to give low pressure for quick idle movements.

The delivery pipes from a duplex pump 53—54 or from the accumulator 199 pass through a shut-off valve 59 (Figs. 19 and 20) located in advance of the fluid operated members of the machine so that flow thereto will be automatically stopped under conditions which, as a matter of safety or for any other reason required, stop it.

The valve 59 is closed by a coil spring 60 and it is opened and held open by a solenoid 61 when and so long as current is flowing through the solenoid. If, for any reason, the solenoid circuit is broken or opened, spring 60 will close the valve 59.

The stem of the shut-off valve 59 also is connected to a switch 193a in the circuit 193b of the main motor 193 so that when valve 59 automatically closes, shutting off the fluid flow to the control valve 50, it also opens said motor circuit for completely stopping the machine. From the shut-off valve 59, the high pressure delivery pipe 51 and the low pressure delivery pipe 52 communicate with a control valve 50 which, as hereinafter explained, automatically controls the supply of oil or fluid under pressure to the plurality of unit cylinders or servo-motors of the machine.

A safety device 134 is provided in the high pressure line 51 and includes a spring loaded valve controlling a switch 135 in a circuit in series with solenoid 61. While the safety device 134 is shown between the cut-off valve 59 and the control 50, it may be placed between the pump 53—54 and the valve 59 or any other desired place in the line 51. If the line pressure is above or below a certain amount, valve 134 operates to open switch 135, thereby breaking the circuit through solenoid 61 and allowing spring 60 to close shut-off valve 59 and to open switch 193a of the main motor circuit. A hand operated switch 136 is also included in the circuit of solenoid 61 by which the machine may be either stopped or started manually.

*Metering valve*

Before passing into and through the control valve 50 the high pressure in line 51 is metered to control and regulate the feed. The low pressure, however, flows to and through the control valve at full capacity and, thus for idle movements the rate of the movement of the piston 46 in the cylinder 47 is governed only by the pump capacity. To meter the high pressure, the metering valve 120 (see Fig. 19) is placed in the high pressure pipe 51 between the shut-off valve 59 and the control valve 50 when more than one machine is connected to a single pump mechanism.

The construction and operation of said metering valve 120 will be understood by reference to Figures 32, 33 and 34 and comprises a body or casing 121 having a liner bushing 122 with a narrow slot 123 extending lengthwise of the bushing which, by a passage 124, is in communication with a high pressure line 51. Rotatably fitting the bushing is a rotary valve 125 which, at one end, has a helix 126 adjacent the slot 123 so that by the rotation of the valve the slot will be opened more or less and, thus the quantity of fluid flowing into the valve 120 and passing onward to the control valve 50 will be greater or less. For rotating the valve 125 its stem, which passes through the packing 127, has outside of the body a crank 128 which, by a rod 129, is connected to a rocker 130 pivoted so that one end of a roller 131 thereof is in the path of a cam 132 attached to and moving with the carriage 37 (see Fig. 2). The rocker roller 130 is supported on the frame of the machine and is held yieldingly in the path of the cam by a spring pressed pin 133. When necessary the metering valve may be operated by hand.

In Figure 19 a single metering valve 120 is shown for controlling the rate of high pressure flow through control valve 50 and, if more than one cylinder or servo-motor is controlled by valve 50, the rate of high pressure flow will be the same for each servo-motor. It may be desirable to have a different device of high pressure flowing to each servo-motor to produce a different rate of feed or speed actuated therefrom and, for that condition, there may be provided a separate metering valve for each cylinder or servo-motor as illustrated in Fig. 50,—where there is a metering valve 241 and 242 in the high pressure line between control valve 50 and each individual cylinder. The metering valves 241 and 242 are of the same construction as metering valve 120 shown in Figs. 19, 32, 33 and 34.

*Control valve*

From the metering valve 120 the fluid flows to a control valve 50 and thence through pipes 48 and 49 to operating cylinders 47 of the unit to be controlled (Figs. 1, 2, 9, 10, 19 and 20). The drain from control valve 50 returns to reservoir 58 through drain pipe 198. The control valve 50 may be of a variety of types and constructions and there may be a separate control valve for each cylinder 47. However, I prefer the type of control valve which controls the several cylinder units of one machine. One type of such valve is the rotary type, shown in Figures 21 to 31.

For brevity of description of operation of the control valve there are employed the terms "ahead" for the forward motion of the slide; "reverse" for the backward motion thereof; "feed" for the slow cutting motion under high pressure and "fast" for the idle motions under low pressure. By way of example as before stated, the high pressure will be given as seven hundred pounds per square inch and the low pressure as fifty pounds per square inch. The control valve 50 includes a body or casing 65 with a low pressure port 66 connected with the low pressure pipe 52 and a high pressure port 67 connected with the high pressure pipe 51. It also has a "slide ahead" port 68 connected by pipe 48 to the carriage cylinder 47, a "slide reverse" port 69 connected by pipe 49 with the opposite side of the carriage cylinder 47, a cross-slide "ahead" port 70 connected by pipe 490 with the cross-slide cylinder 79, a cross-slide "reverse" port 71 connected by pipe 480 with the cross-slide cylinder and a drain or exhaust port 72 connected by pipe 198 with the reservoir 58.

Within the valve body 65 is a rotary valve 73, preferably in a liner bushing 74, and the body ends are closed by removable heads 75 and 76 (Fig. 21), respectively, which permit the ready removal and replacement of the rotary valve. The rotary valve 73 is cylindrical and in its periphery are provided grooves 77 which by the indexing of the valve changes the connections between the high and low pressure ports 66 and 67 and the various slide operating ports. The valve as shown has five index positions and in each one of these positions, the grooves 77 connect different combinations of ports, thereby providing different slide conditions such as carriage 37 fast ahead, carriage 37 feed ahead, cross slide 44 fast ahead etc., and it is apparent that by increasing the number of index positions or changing the valve grooves, any combination and any number of combinations within reason can be obtained. For the operation therein defined, it has been found that the valve 73 need only have four grooves 77, of the design shown in the layout in Fig. 24, these grooves being indicated as *a*, *b*, *c* and *d*.

The automatic and manual control of the indexing of valve 73 is accomplished as follows: Valve 73 is keyed to a shaft 73a to which is keyed a gear 98 (see Figs. 19 and 20) meshing with a pinion 99 on the rotor of an electric motor 100. The gear 98 carries a series of detents 102 or switch operating devices corresponding in number and location with the various indexed positions of the valve 73. Each detent travels in its own orbit and engages at the proper time its own switch 101 arranged in the path thereof. Each switch 101 is in circuit with a normally open switch 104 in the path of one of several dogs 105 adjustably located, as hereinbefore stated, on the slide 40 carried by the carriage 37 (see Figs. 2, 16 and 20). The switches 101 are normally closed and therefore, when any particular switch 104 is closed by any one of the dogs 105 on the dog slide 40, a circuit is formed through its corresponding switch 101 and starter switch 107 closing the same and starting motor 100. The motor, thus started, continues to run until a detent 102 engages the appropriate switch 101 opening it and breaking the circuit through starter switch 107, thus stopping the motor and the rotation of the valve. This operation of motor 100 changes the position of valve 73 and sets up a new combination of hydraulic circuits until a different combination is selected by the dogs 105. To assure instant stoppage of the motor, and therefore, of the rotary valve, a brake is provided which includes a brake drum 108 on the motor shaft, a brake shoe 109 pressed toward the drum by a spring 110 and a solenoid 111 in the motor circuit which, when current is supplied to the motor, acts to lift and hold the brake shoe from the brake drum and upon the opening of the motor circuit the spring 110 acts to move the shoe into contact with the drum.

Figure 1:
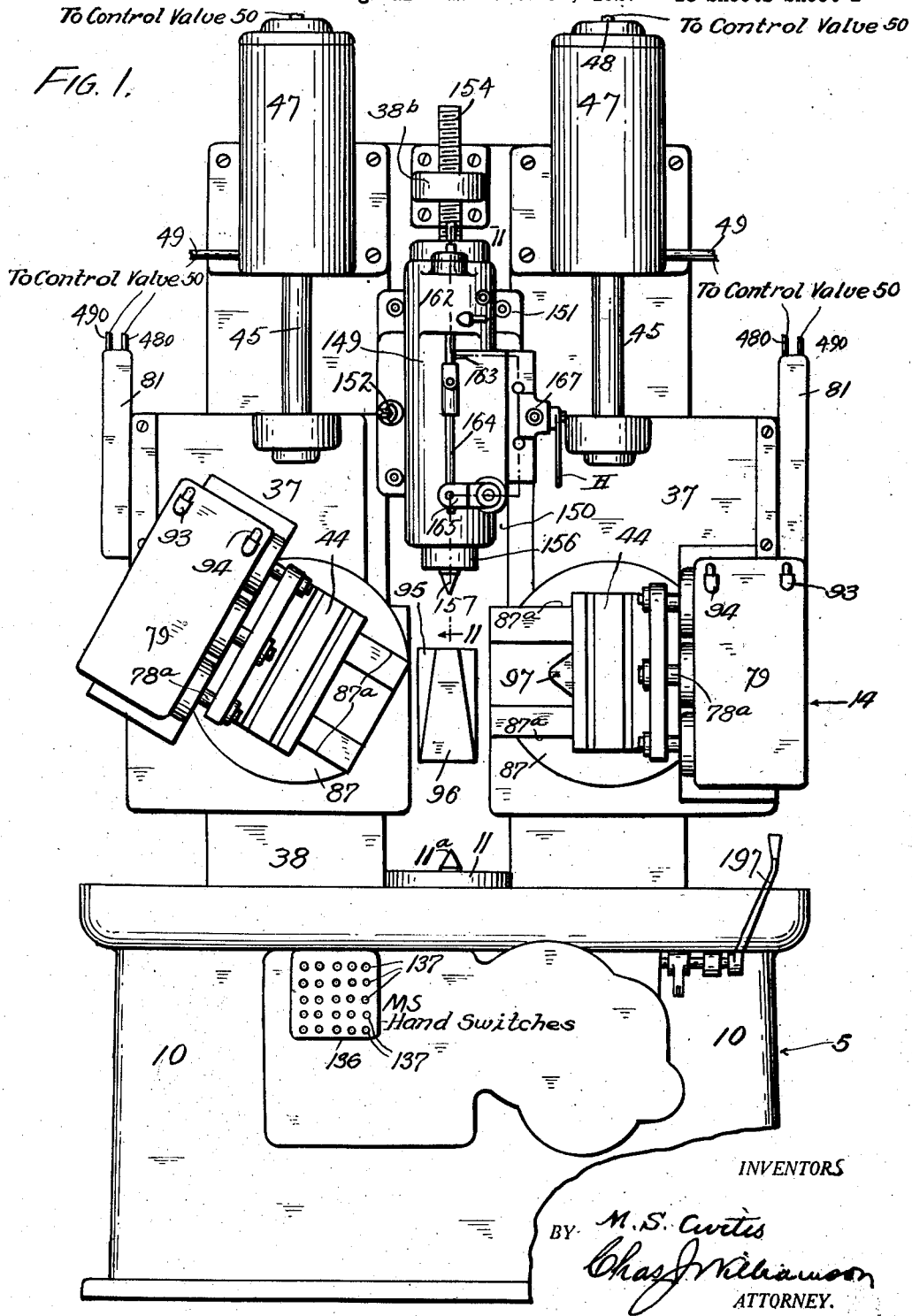
Figure 1 is a front elevation of such machine tool.

Besides the automatically controlled switches 104, whose action depends upon the movement and positions of the carriages or other member of the machine, there is provided hand switches 137, as may be seen by reference to Figs. 1 and 20, which are the same in number as the automatic switches 104 and are, respectively, in the circuit 103 of which the switches 104 form a part—in order that a manual control of the movements of the control valve 50 may be effected similarly to that of the automatic control. The arrangement and circuit connections of the switches 137 are such that, when one of the hand switches 137 is operated it breaks the circuit which includes the automatically operated switches 104, thus constituting an interlock control so as to make it impossible, at the time of closing of any one of the hand switches, for one of the automatically controlled switches to start the distributing valve motor 100.

Time delay switch

The operation of the control valve 50 is practically instantaneous when the switches are closed by the carriage or moving member. Under some conditions it is desirable to hold the slide or moving member stationary before reversing or otherwise changing its movement. For example, when a tool slide finishes its feed stroke, it may be desirable to retain it in that position for an interval in order that the tool may take a cleaning-up chip before reversing the stroke. Without provision of means to prevent it, it will be seen that immediately after the slide reaches the end of its feed stroke the control valve will be shifted for the reverse stroke, and thus reverse would start immediately. There is placed, in the electrical circuit controlled by that one of the switches 104, (i. e. 104a) which produces the reverse position of the control valve, a solenoid actuated switch 112 which is normally open and which is closed by the closing of switch 104, after an interval of time required to maintain the tool slide in a stationary or stopped position. This delayed action may be also produced by any other type of switch shown in Figs. 35 to 37, and which includes separated stationary contact 113 and a movable contact 114, the latter being carried by a plunger 115 under the control of a dash pot 116 which includes a movable cylinder section 117 directly acted upon by a lever 118 having an arm 119 in the path of the dog 105 on the dog-slide 40 so that, notwithstanding movement of the lever 118 by the dog 105, the final closing of the circuit through the contacts 113 and 114 will be delayed for the desired interval of time. It will be understood that, when the dog 105 moves the arm 119 to the dotted line (Fig. 35) it depresses cylinder section 117 to the position shown in Fig. 36, compressing spring 117a and moving spring-pressed latch 115a from engagement with plunger 115. Spring 117a now begins to expand moving plunger 115 downwardly which movement is retarded by the piston head 115 forcing air through reduced openings 116a. The size of opening 116a controls the time of movement of the plunger 115 from the position in Fig. 36 to the position in Fig. 37, where the contacts 113 and 114 are in engagement. After the contacts 113 and 114 engaged and the dog 105 moved out of engagement with arm 119, the spring 118a returns lever 118 and its connected parts to the position shown in Figure 35. By this arrangement, it is possible to have the cross-slide arrested in its motion by a positive stop and there held, under pressure of the liquid in the cylinder 79, for the desired length of time before the control valve 50 is shifted to the "reverse".

Alternative valve construction

The control valve 50, above described, is designed to control more than one operating unit of a machine. It may be desirable to provide a control valve for each operating unit and for this purpose a valve, shown in Figures 40 to 46 may be employed. This valve consists essentially of a valve body 224 having a port 226 to which is connected the low pressure delivery pipe 52, a port 511 to which is connected the high pressure delivery pipe 51, a port 227 which is connected by pipe 48 to cylinder 47 on the side of the piston to produce movement of the slide with respect to the work, a port 228 connected by pipe 49 to the cylinder 47 on the other side of the piston so as to produce slide motion away from the work, or reverse, and a port 229 connected by pipe exhaust 198 with the exhaust.

The valve body 224 contains liner bushings 230 and 231 suitably ported and held in place by plugs 232 and 233. In these bushings are slidable plungers 234 and 235, also suitably ported and which carry, in one end, pins 236 and 237 which co-act with groove 238 in cam 239. Cam 239 is keyed to shaft 240 to one end of which is keyed gear 98 (the same gear as shown in Figures 20 and 20a) and by means of said gear and cam and motor 100 and its electrical connections, as illustrated in Figure 20, plungers 234 and 235 may be moved into their various control positions, it being understood that each individual control valve 224 will have its own individual motor 100 and indexing gear 98 and control switches. Five positions of these plungers are shown in Figures 42 to 46, the direction of fluid flow being shown in Figure 46 by the arrow, and each of these five positions gives a different type of movement to the piston and slide controlled by the particular valve.

Another alternative type of control valve is illustrated in Figure 48 and comprises a casing or body 214 having a plurality of plunger valves normally held closed by spring 215, but which may be opened and held open by solenoid 216. High pressure line 51, low pressure line 52 and exhaust or return line 198 enter the valves and pipes 48 and 49 leading from the valve to the cylinder. The raising of a plunger valve by its solenoid 216 opens a series of ports giving the proper conditions of flow and, therefore, the four plunger valves give the four conditions corresponding to feed ahead, feed reverse, fast ahead and fast reverse. A fifth condition, that of stopping, is provided when all the valves are closed. In Figure 48, one valve is shown open having been opened through the action of one of the dogs 105 on slide 40, closing switch 220 and thus energizing solenoid 216. When open, the end of the valve closes its holding circuit switch 217 through circuit 218 and this holding circuit continues to keep the valve open until another dog 105 acts on another switch 220. The first action of this switch is to break the common holding circuit 218 and which de-energizes any solenoid which happens to be energized, allowing the valve to be closed by the action of spring 215. Its next action will be to close the circuit energizing the solenoid of its particular valve which will close its particular holding circuit. As the dog 105 moves away from switch 220 the first action is to close the holding circuit 218. The second action is to break the starting current, but as the holding circuit is closed through switch 217, the valve is held open until the same procedure, as above, is brought about again by the action of another dog 105. The action of a dog 105 on switch 223 breaks the common holding circuit without energizing any valve solenoid. Thus, by the opening of this switch all valves close. Hand switches 137a are provided for accomplishing manually the same results as are accomplished automatically by dog controlled switches 220.

As above pointed out an important advantage of my invention is the possibility of remote or distant location of the hand switches. There is illustrated, in Figure 1, the manual switch board containing the hand operating switches 137, located on the front of the machine base 10. It may be desirable for manual operation to have additional manual switch boards located in other places. In Figure 38 is shown two sets of hand controlled switches, designated unit 1 and unit 2, which are in every way identical and each of which operates a control valve 50. A third or master switch unit is wired in parallel with units 1 and 2 and, therefore, by actuating the switches 245 of this master switch unit, any number of units may be simultaneously controlled.

There is shown, in Figure 39, an alternative means for accomplishing the same purpose. In this case, there is but one set of hand switches 246 and these are placed in circuit of control valve of unit No. 1 by closing switch 247 or in circuit with the control valve of unit No. 2 by closing switch 248, or they may be placed in circuit with both units No. 1 and No. 2 by closing both switches 247 and 248.

*Operation*

In order that the function of the invention herein described may be fully understood, the operation thereof will now be described in connection with the sequence of operation of the machine with which the invention is illustrated. However, as above stated, the invention may be applied to various types of machine having a different sequence of operation, this sequence of operation being altered or provided for by the disposition of the dogs 105 on the dog-slide 40 and the design of the valve passages 77 in the control valve 50, and in describing this operation, it is illustrated by the type of control valve shown in Figures 21 to 31, inclusive.

Assume the machine to be stopped with spindle motor 193 stopped, carriage 37 and slide 44 in their farthest retracted positions from the work, and rotary valve member 73 of control valve 50 is in the position shown in Figure 25, which position stops motion of the carriage and cross slide. To start operation of machine and invention, the operator closes switch 136 (see Figs. 1 and 20), energizing solenoid 61 which closes switch 193a, starting motor 193, operation of pump 53—54 and opens valve 59 so that fluid can flow from pump to the control valve 50. If not already in that position he, by means of handle 197, shifts cone thimble 195 to the position where shaft 20 is braked by friction clutch 194a (Fig. 7). This prevents starting of the spindle while loading work in the machine. He then places a piece of work between live center 157, first moving, if necessary, handle H (Figs. 1 and 12) to the position where the tail-stock center 157 is retracted. He then moves handle H to the position where tailstock 157 is pressed into the center in the work by piston 158 and then, as resistance is built up, sleeve 156 is automatically bound by piston 161 actuating the binder 160. He then operates lever 197 to clutch shaft 20 with pulley 1004 which, as motor 193 is running, has been running idly on shaft 20. If clutch thimble 24 is retracted from clutch 23 the spindle is driven at its slow speed through pinion 22 and roller ratchet gear 21.

The operator then presses the proper hand switch 137 to index the control valve 50 into the position shown in Figure 26 corresponding to fast "reverse" on the carriage and fast "ahead" on the cross-slide. As the carriage is already at the extreme end of its reverse stroke the fast reverse on the carriage does no more than hold it in that position. The fast "ahead" on the cross-slide causes the cross-slide 44 to approach rapidly the work and this movement of the cross-slide, by the previously described train of gearing, causes movement of the dog-slide 40 relatively to switches 104. This fast movement of the cross-slide "ahead" continues until a dog 105, previously adjusted on slide 40, closes a switch 104, causing the control valve 50 to index into the position shown in Fig. 27, which produces or brings about the cross-slide to feed ahead slowly for work operations and the carriage fast "reverse" for the purpose of maintaining the carriage in its uppermost position during the first cutting operations of the tool on the cross-slide 44. The cross-slide tool continues to feed transversely of the work until shoe 97 abuts against former cam 96, which stops the movement of the cross-slide where it is held against this former by the pressure of the fluid. At this point due to the movement of the cross-slide 44 which has transmitted to the dog-slide 40, another preadjusted dog 105 on dog-slide 40 trips another switch 104 causing the control valve 50 to index into the position shown in Figure 28, which maintains the cross-slide feed "ahead" and starts the carriage feed "ahead". The cross-slide feed "ahead" serves simply to keep the cross-slide against the former and the carriage feed "ahead" now causes the carriage to feed towards the spindle 11. When the carriage has fed a sufficient distance for the tool (not shown) on the cross-slide to remove the desired portion of metal, it has also brought a preadjusted dog 105 on slide 40 in position to close the switch 104a which is in series with the time delay relay 112. No action takes place immediately, but after the predetermined time for which the relay is set, as previously explained, the relay switch 112 closes causing the control valve 50 to index into the position shown in Fig. 30. This starts carriage fast "reverse" and cross-slide fast "reverse" returning them to their original positions retracted from the work.

It is understood that this is only one particular cycle of movement of the cross-slide 44 and carriage 37 and that other combinations may be effected by changing the grooves 77 in the rotary valve member 73, as hereinbefore described, and also by varying the position of the dogs 105 on slide 40. This sequence of operations can also be secured manually by the push buttons 137. The above describes the operation of one carriage 37 and cross-slide 44, but it is to be understood that the other carriage and cross-slide may at the same time be performing similar or different sequence of operations on the work.

While these operations have been proceeding it may be desirable to automatically change the speed of the spindle and to accomplish this a dog 39 may be adjusted on slide 40 to operate valve 31 at the desired time and, thus, through cylinder 28, piston 27 and rod 26 shift the clutch thimble 24 (Figs. 7, 8 and 16) in a manner hereinbefore described thus changing the spindle speed.

It also may be desirable, while the machine functions are proceeding, to vary the rate of feed of the carriages 37 and cross-slides 44. To accomplish this, face cam 132 may be placed to dog-slide 40 to change, at the desired times, the adjustment of the metering valve 120, thus changing the rate of feed of the carriages 37 and cross-slides 44 in a way hereinbefore described.

If, during the operation of a machine, there should be a failure of the current in the control circuit, illustrated in Figure 20, which failure would be detrimental to the machine and work, solenoid 61 is de-energized and spring 60 closes valve 59 shutting off all fluid pressure from the slides, thus stopping their movement, and also opens switch 193a, thus de-energizing the main motor 193 and stopping the spindle 11.

If the pressure in the hydraulic line rises or falls to the danger point, at which relief valve 134 is set, this relief valve opens switch 135 breaking the control circuit and stopping both the spindle and the slides through the operation of valve 59 as previously described.

At the completion of the machine operations, the operator actuates hand lever 197 to disengage the drive clutch 194, and continuation of this movement applies spindle brake 194a, thus stopping the spindle 11. He then, by means of tail-stock handle H, moves valve 166 into such a position that piston 161 first moves upward, thus releasing a binder 160 and then piston 158 moves upward retracting the tail-stock spindle 157 from the work which he then removes from the machine.

As previously mentioned, cross-slide base 87 may be swiveled on carriage 37 in order that the cross-slide may feed at an angle other than a right angle with the axis of the spindle so as to produce beveled cuts. Also, a chuck or face plate may be fastened to the nose of spindle 11 in place of the live center 11a and the work can be held by this chuck or face plate instead of between centers. The tailstock 155 can be removed and replaced with a carriage or slide, with its operating cylinder, similar to carriage 37 and its cross slide 44, or the tail-stock may be replaced solely by a slide similar to slide 44 and its operating cylinder connections, but the slide may in addition carry the usual tool carrying turret, which turret may carry drills, boring bars, turning tools or any other type of tool usually carried on the turret of a turret lathe.

That which is claimed is:—

1. As an improvement in machine tools, the combination of means for producing fluid pressure, a plurality of units each having a pressure-actuated device, an operable machine member for each pressure-actuated device and to which the movements of said device are transmitted, means connecting each of said units with said pressure producing means, said pressure producing means being common to the pressure-actuated devices of all the units, and automatic control means for the units under the control of at least one of said operable machine members.

2. A machine tool as in claim 1, in which the automatic control means comprises electrical circuits including switches actuated by the movement of at least one of said operable machine members.

3. A machine tool as in claim 1 further characterized by the automatic controlling means comprising electrical circuits including switches actuated by at least one of said operable machine members and manually operable switches.

4. A machine tool as in claim 1 further characterized by the automatic controlling means comprising electrical circuits including switches actuated by at least one of said operable machine members, and other circuits having manually operated switches therein for accomplishing the same operation manually as the switches actuated by said machine member and, when operated for manual operation, rendering the machine member actuated switches ineffective.

5. A machine tool as in claim 1, in which the automatic control means comprises electrical circuits including switches actuated by at least one of said machine members and a single control valve means for distributing fluid under pressure to the respective units, said electrical circuits having other switches operatively associated with said control valve means to be actuated thereby.

6. As an improvement in machine tools, the combination of fluid circulating means, a plurality of units in the line of circulation having each a fluid-moved device and a machine member to which the movements of said device are transmitted, said circulating means including a single set of pumps by which fluid is transmitted under pressure to all of said devices and further including a single valve through which the fluid pressure passes to said fluid-moved devices.

7. As an improvement in machine tools, a combination of a plurality of units, each comprising a hydraulic servo-motor, machine members to which the movements produced by each servo-motor are communicated, respectively, a source of fluid pressure supply, means for circulating said fluid supply to said servo-motors, a common valve means for controlling said supply to at least certain of said servo-motors, said control valve means having means to selectively vary the direction of flow of fluid pressure from said source to the servo-motors connected therewith, whereby pressure may flow in opposite directions to different motors, or in the same direction.

8. As an improvement in machine tools, a combination of a plurality of units, each comprising a hydraulic servo-motor, machine members to which the movements produced by said servo-motors are communicated respectively, a single pump capable of producing fluid pressure in different volumes and connected with said servo-motors, and a single valve directly connected with certain of said servo-motors for controlling the supply of fluid from the pump to said certain servo-motors and having means therein for changing the distribution of the different volumes to the several servo-motors connected therewith.

9. As an improvement in machine tools the combination of a plurality of units, each comprising a hydraulic servo-motor and a machine member to which the movements produced by said servo-motors are communicated, a single pump connected with all of said servo-motors, and a single valve means through which the fluid pressure flows from the pump to the servo-motors, said valve means having means to vary the direction of flow of the fluid delivered to the servo-motors.

10. A control device for machine tools which latter have a movable member and an actuating means for said member to move it in opposite directions, said control device comprising means for controlling the reversing of the movement of said member and which includes an electric circuit having a time delay switch to start reverse movement of the member after a desired time period has elapsed after the limit of movement in one direction is reached.

11. A hydraulic control for lathes, comprising a member to be moved, a fluid pressure actuated device connected with such member, means circulating fluid under pressure, control means for reversing the direction of movement of said member, and electrical means comprising an automatically operated switch to start reverse movement of the member after a desired time period has elapsed after the limit of movement of said member in one direction is reached.

12. As an improvement in machine tools, the combination of a machine member to be moved, a fluid-pressure-actuated device connected with such member, means circulating fluid comprising means for subjecting fluid to pressure, control means for reversing the direction of movement of said member, and means to delay reverse movement of the member for a desired period after the limit of movement in one direction is reached, said last mentioned means including an electric circuit having a delayed-action switch.

13. A machine having movable members, fluid pressure operated devices connected with said members, means to deliver fluid to said device at substantially different pressures and in substantially different volumes comprising a duplex pressure supplying element having members that, respectively, are of different power and volume capacity, a common control valve means for controlling the delivery of fluid to the devices, automatic means to operate said valve, and remotely located manual means to operate said valve.

14. A machine having a movable member, a fluid pressure operated device connected with said member, means to deliver fluid to said device at substantially different pressures and in substantially different volumes comprising a duplex pressure supplying element having members that, respectively, are of different power and volume capacity, and fluid pressure control that includes a remotely located extension thereof.

15. In a control device of the character described to be connected in a fluid pressure circulatory system including a fluid pressure source and a fluid pressure-operated device therein, said control device comprising an operable valve means for controlling the flow of fluid to and in the fluid-operated device, electrical valve operating means including electrical circuits, and operable switches in said circuits for controlling the movement of said valve.

16. In a control device of the character described to be connected in a fluid pressure circulatory system including a fluid pressure source and a fluid pressure-operated device therein, said control device comprising an operable valve means for controlling the flow of fluid to and in the fluid-operated device, electrical circuits having solenoid means therein for operating said valve means and further having operable switches therein controlling the operation of said solenoid means.

17. In a control device of the character described to be connected in a fluid pressure circulatory system including a fluid pressure source and a fluid pressure-operated device therein, said control device comprising an operable valve means for controlling the flow of fluid to and in the fluid-operated device, electrical valve operating means including electrical circuits, and operable switches in said circuits for controlling the movement of said valve and time delay mechanism in the circuit of at least one of said switches controlling said valve.

18. In a control device of the character described to be connected in a fluid pressure circulatory system including a fluid pressure source and a fluid pressure-operated device therein, said control device comprising an operable valve means for controlling the flow of fluid to and in the fluid-operated device, electrical valve operating means including electrical circuits and operable switches in said circuits for controlling the movement of said valve, and means adapted to be connected in the fluid pressure line for interrupting the flow of said pressure to fluid pressure operated device and responsive to variations in pressure in said line.

19. In a control device of the character described to be connected in a fluid pressure circulatory system including a fluid pressure source and a fluid pressure-operated device therein, said control device comprising an operable valve means for controlling the flow of fluid to and in the fluid-operated device, electrical valve operating means including electrical circuits, and operable switches in said circuits for controlling the movement of said valve, and a circuit for controlling the pressure supply source and having a switch therein responsive to variations in fluid pressure from said fluid pressure source, whereby pressure to said fluid pressure operated device from the pressure source may be interrupted.

20. In a control device of the character described, including in combination, a fluid pressure-operated device, means for delivering fluid pressure to said device at substantially different pressures and in substantially different volumes comprising a duplex fluid supplying element having members that are respectively of different pressure and volume capacity, an operable valve controlling the fluid flow from the delivering means to the fluid pressure operated device for selectively distributing said different pressures and volumes of fluid to the latter, electrical means including electrical circuits having operable switches therein for selectively operating said valve.

21. In a control device of the character described, including in combination, a fluid pressure operated device, means for delivering fluid to said device at substantially different pressures and in substantially different volumes comprising a duplex fluid supplying element having members that are respectively of different pressure and volume capacity, an operable valve for controlling the fluid flow from said delivering means to the fluid pressure-operated device for selectively distributing said different pressures and volumes of fluid to the latter, electrical means including circuits having solenoid means and operable switches therein for selectively operating said valve, and a time delay mechanism in the circuit of at least one of said switches controlling the valve.

22. In a control device of the character described, including in combination, a fluid pressure-operated device, means for delivering fluid pressure to said device at substantially different pressures and in substantially different volumes comprising a duplex fluid supplying element having members that are respectively of different pressure and volume capacity, an operable valve controlling the fluid flow from the delivering means to the fluid pressure operated device for selectively distributing said different pressures and volumes of fluid to the latter, electrical means including electrical circuits having operable switches therein for selectively operating said valve, and means responsive to pressure variations in the fluid delivering means for shutting off fluid to said valve and stopping said fluid pressure supplying element.

23. In combination, a plurality of fluid pressure actuated devices, means for producing fluid pressure, a single device for controlling the flow of the fluid from said means to the pressure actuated device, electrical means for operating said control device including switches operated by the fluid pressure actuated device.

24. As an improvement in machine tools, the combination of a plurality of operable machine elements for performing certain functions during the running of the machine and which includes a rotatable spindle and an operable tool carrier, a plurality of servo-motors for actuating respectively certain of said machine elements, automatic operable means for controlling and correlating the operation of said servo-motors for effecting the movements of their machine elements to perform their said respective functions, said automatic control means including electric circuit means having switches therein controllable by the movement of more than one of said machine elements for controlling the operation of said automatic means.

25. As an improvement in machine tools, the combination of a plurality of operable machine elements for performing certain functions during the running of the machine and which includes a rotatable spindle and an operable tool carrier, a plurality of motors each operatively connected with at least one of said operable elements for causing the same to perform certain functions, automatic means for controlling and correlating the operation of said motors for effecting the movement of their machine elements to perform their said respective operations and including electrical circuit means having switches therein, certain of said switches and circuit means being so arranged as to be operated at predetermined relative positions of at least two of said machine elements for selectively controlling certain of said motors in timed relation with respect to each other, and means operated synchronously with said last mentioned machine elements for actuating said last mentioned switches.

26. In a machine having a prime mover for certain instrumentalities thereof and further having a fluid pressure operated device cooperatively associated with the instrumentalities driven by said prime mover, fluid pressure delivery means connecting said fluid pressure operated device with a source of fluid pressure, and means responsive to variations in fluid pressure for controlling the operation of the prime mover.

27. In a machine tool having a prime mover for certain instrumentalities thereof and means for circulating therein fluid under pressure to certain instrumentalities of the machine in cooperative association for work performing operations, and means responsive to the variations in the fluid pressure for controlling the operation of said prime mover.

28. As an improvement in machine tools, the combination of means for producing fluid pressure, a plurality of units each having a pressure-actuated device, the units being separate machines each complete with its own characteristic members, operable machine members to which the movements of said devices are transmitted, respectively, means connecting each of said units with said pressure-producing means, and a single control valve for distributing fluid under pressure to the respective units, said valve controlling separate circuits for the respective units.

29. A machine as in claim 28 in which the control valve is interchangeable with other control valves.

30. As an improvement in machine tools, the combination of fluid circulating means, a plurality of units in the line of circulation and each having a fluid moved device, the units being separate machines each complete with its own characteristic members, operable machine members to which the movements of said devices are transmitted, respectively, said circulating means including a single pump member by which fluid is transmitted under pressure to all of said devices, and a single control valve for distributing fluid under pressure to the respective units, said valve controlling separate circuits for the respective units.

31. As an improvement in machine tools, the combination of means for producing fluid pressure, a plurality of units each having a pressure-actuated device, the units being separate machines each complete with its own characteristic members, operable machine members to which the movements of said devices are transmitted, respectively, means connecting each of said units with said pressure-producing means, said means being common to the pressure-actuated devices of all the units, and means actuated by said members that control the fluid pressure upon said devices.

32. A machine as in claim 31 in which the means for controlling the fluid is electrical.

33. As an improvement in machine tools, the combination of means for producing fluid pressure, a plurality of units each having a pressure-actuated device, operable machine members to which the movements of said devices are transmitted, respectively, means connecting each of said units with said pressure-producing means, said members being parts of a single machine, a single control valve for distributing fluid under pressure to the respective units, and means actuated by said members to operate said control valve.

34. As an improvement in machine tools, the combination of fluid circulating means, a plurality of units in the line of circulation each having a fluid-moved device and an operable machine member to which the movements of said device are transmitted and at least one of said members carrying work performing tools, said circulating means including a single pump by which fluid is transmitted under pressure to all of said devices, said members being parts of a single machine, a single control valve for selectively distributing fluid under pressure to at least certain of said fluid-moved devices, and means actuated by said members of said last mentioned fluid-moved devices to operate said control valve.

35. As an improvement in machine tools, the combination of means for producing fluid pressure, a plurality of units each having a pressure actuated device and an operable machine member to which the movements of said device are transmitted and at least one of said members carrying work performing tools, means connecting each of said units with said pressure-producing means, said members being parts of a single machine, a control valve for selectively distributing fluid under pressure to at least certain of said fluid-moved devices, means actuated by certain of said members to operate said control valve, and manual means to operate said control valve.

36. As an improvement in machine tools, the combination of fluid circulating means, a plurality of units in the line of circulation each having a fluid-moved device and an operable machine member to which the movements of said device are transmitted, said circulating means including a single pump member by which fluid is transmitted under pressure to all of said devices, said members being parts of a single machine, a control valve for distributing fluid under pressure to the respective units, means actuated by said members to operate said control valve, and manual means to operate said control valve.

37. The combination of an operable member to be moved, a fluid pressure actuated device connected with such member, and means for circulating fluid comprising means for subjecting fluid to pressure, a valve for regulating the circulation of said fluid, and automatic fluid shut-off means situated in advance of said valve.

38. A machine as in claim 37 having a spindle, driving means for spindle and fluid circulating means, and means for automatically stopping the driving means when the fluid shut-off means is operated to shut off the fluid.

39. A machine as set forth in claim 37 further characterized by manual control means for said shut-off means.

40. The combination of an operable machine member to be moved, a fluid pressure actuated device connected with said member, means for circulating fluid comprising means for subjecting fluid to pressure, a valve for regulating the circulation of said fluid, control means for said valve, and means automatically actuated by failure of said control means for shutting off fluid pressure to said pressure actuated device.

41. A machine as set forth in claim 37, further characterized by having a power driven member and means acting simultaneously with said fluid shut-off means to stop the application of power to the power driven member.

42. A machine as in claim 37 further characterized by means responsive to predetermined pressure variations in the fluid circulating means for actuating said fluid shut-off means.

43. As an improvement in machine tools, the combination of means for producing fluid pressure, a plurality of units each having a pressure actuated device, an operable machine member for each pressure actuated device to which the movements of said device are transmitted, means connecting each of said units with said pressure producing means, said pressure producing means being common to the pressure actuated devices, all of the units having a common control valve for all of the pressure actuated devices, and fluid metering means for each unit between the pressure actuated device and the pressure producing means.

44. As an improvement in machine tools, the combination of means for producing fluid pressure, a spindle, driving means for said spindle including clutch means therein, an operable machine member that carries a tool, pressure-actuated device for operating said machine member, means connecting said pressure actuated device with said pressure-producing means, a fluid-clutch-actuating means for engaging and disengaging said clutch means, and mechanism controlled by the movement of said machine member to actuate said fluid pressure clutch actuating means.

45. As an improvement in machine tools the combination of means for producing fluid pressure, a pressure actuated device, an operable machine member operated by said pressure actuated device, a valve for controlling the flow of fluid from the pressure producing means to said pressure actuated device, automatic means operated by said machine member for controlling said valve, a work carrying spindle, means for driving said spindle at various speeds including clutches, a pressure operated device for operating said clutches, said pressure operated device being connected to said pressure-producing means, and control means for said clutches operated by the machine member.

46. As an improvement in machine tools, the combination of means for producing fluid pressure, a spindle, a variable speed driving means for the spindle including means for effecting change speed, an operable machine member which carries the tool, pressure actuated device for operating said machine member, means connecting said pressure-actuated device with said pressure-producing means, a second fluid actuating device for operating said change speed means, and mechanism controlled by the movement of said machine member to actuate said change speed pressure actuating means.

47. In a hydraulically operated compound tool slide, the combination of a slidable carriage, a plate swively connected to said slidable carriage including a swivel stud, a slide on said plate, a servo-motor carried by the plate and connected to said slide to operate the latter, said carriage and plate being provided with means for conducting hydraulic pressure therethrough to the servo-motor, and said swivel stud having passages therein connecting the passage means in said carriage and plate.

48. In a hydraulically operated compound tool slide, the combination of the slidable carriage, a plate swivelly connected to said slidable carriage including a swivel stud fast to the plate, a slide on said plate, a servo-motor carried by the plate and connected to said slide to operate the latter, said carriage and plate being provided with means for conducting hydraulic pressure therethrough to the servo-motor, and said swivel stud having annular grooves in the periphery of the portion thereof within the confines of said carriage and having passages through the body connected at their other ends with passages in said plate, the passages in said plate communicating with said servo-motor and passages in said carriage being connected at one end with said grooves, respectively, and at their other end being connected to the source of fluid pressure.

49. As an improvement in machine tools, the combination of means for producing fluid pressure, a plurality of units having each a pressure-actuated device, and including a machine member that carries a tool and a slide to which the movements of said device are transmitted, means connecting each of said units with said pressure producing means, said pressure producing means being common to the pressure actuated devices of all the units, and selective pressure-control means whereby any one of several desired movements of the machine may be given at will.

50. As an improvement in machine tools, the combination of means for producing fluid pressure, a plurality of units having each a pressure-actuated device, and including a machine member that carries a tool and a slide to which the movements of said device are transmitted, means connecting each of said units with said pressure producing means, said pressure producing means being common to the pressure-actuated devices of all the units, and means for controlling the pressure to each unit independently or collectively.

51. A machine tool tail-stock having a work-supporting center and fluid pressure operated means for moving one center relatively to the tail-stock, fluid-pressure-operated clamping means for holding the center in adjusted positions, fluid connections to both of said fluid pressure operated means, and a valve in said connections and adapted by single movement to control pressure for moving the center and operating the clamp.

52. In a machine tool having a tail-stock, an adjustable work supporting center in the tail-stock, means for clamping the center in its adjusted positions, hydraulic actuated means for adjusting the center and actuating said clamp, said hydraulic actuated means including a cylinder and piston connected with the center and a cylinder and piston connected with said clamp, and fluid passages between said cylinders including valve means controlling said passages and permitting pressure built up in the cylinder for the center to actuate the piston in the cylinder for the clamping means, and conversely.

53. In a machine tool, operable instrumentalities for producing work performing operations, a prime mover for at least one of said instrumentalities, means for supplying fluid to certain of said instrumentalities, and means responsive to the variations in pressure of said fluid for controlling the operation of said prime mover.

54. In a machine tool organization, operable instrumentalities for producing work operations, a prime mover for operating at least one of said instrumentalities, a fluid circulating system for delivering fluid to certain of said instrumentalities, an electrical circuit for said prime mover, and a switch operable by said fluid circulating system for controlling said electrical circuit and effecting the operation of said prime mover.

55. In a machine tool organization, instrumentalities for performing work operations, a fluid circulating system including a prime mover for supplying fluid to certain of said instrumentalities, a second prime mover for actuating at least one of said instrumentalties, an electrical circuit for effecting the operation of said last mentioned instrumentality, and means controlled by the pressure in said circulating system for controlling said circuit, whereby the operation of said second prime mover is effected.

56. In a machine tool as set forth in claim 53, further characterized by an electrical circuit for said prime mover, a switch for said circuit, and a solenoid operated switch in said circuit, said solenoid being controlled by the operation of said pressure responsive means.

57. As an improvement in machine tools as set forth in claim 25 further characterized by manually operable switching means in said circuit means arranged so that in one of its positions said automatic control means is effective and in another of its positions said automatic control means is ineffective and permits selective manual control of one or more of said motors.

58. As an improvement in machine tools as set forth in claim 25 further characterized by a second set of switches manually operable and connected in said circuit means for selectively controlling the operation of certain of said motors, and interlocking means rendered effective by the operation of any one of said manually operable switches to render said certain switches of the automatic control means ineffective.

59. As an improvement in machine tools as set forth in claim 25 further characterized by a time delay switch in said circuit means for delaying the operation of one of said motors for a desired interval of time after the one of said machine elements has reached a predetermined position.

MYRON SHIRLEY CURTIS.